(12) United States Patent
Laremenko et al.

(10) Patent No.: US 10,951,414 B2
(45) Date of Patent: *Mar. 16, 2021

(54) METHOD FOR SECURING DIGITAL CURRENCY

(71) Applicants: Andrey Laremenko, Bat Yam (IL); Eyal Moshe, Tel Aviv (IL)

(72) Inventors: Andrey Laremenko, Bat Yam (IL); Eyal Moshe, Tel Aviv (IL)

(73) Assignee: HUB DATA SECURITY LTD., Tel Aviv (IL)

( * ) Notice: Subject to any disclaimer, the term of this patent is extended or adjusted under 35 U.S.C. 154(b) by 151 days.

This patent is subject to a terminal disclaimer.

(21) Appl. No.: 15/881,874

(22) Filed: Jan. 29, 2018

(65) Prior Publication Data
US 2019/0238337 A1    Aug. 1, 2019

(51) Int. Cl.
| | |
|---|---|
| H04L 29/06 | (2006.01) |
| G06F 21/00 | (2013.01) |
| H04L 9/32 | (2006.01) |
| G07F 7/08 | (2006.01) |
| G06Q 20/06 | (2012.01) |

(52) U.S. Cl.
CPC .......... *H04L 9/3234* (2013.01); *G06Q 20/06* (2013.01); *G07F 7/082* (2013.01); *H04L 2209/56* (2013.01)

(58) Field of Classification Search
CPC ... H04L 9/3234; H04L 2209/56; G06Q 20/06; G07F 7/082; G09C 1/00
See application file for complete search history.

(56) References Cited

U.S. PATENT DOCUMENTS

| | | | | | |
|---|---|---|---|---|---|
| 5,260,941 | A | * | 11/1993 | Wilder | H04W 84/16 370/267 |
| 6,029,151 | A | * | 2/2000 | Nikander | G06Q 20/02 705/39 |
| 7,937,438 | B1 | * | 5/2011 | Miller | H04L 41/12 709/203 |
| 9,396,358 | B1 | * | 7/2016 | Yap | G06F 21/86 |
| 9,648,015 | B1 | * | 5/2017 | Avetisov | H04L 63/0861 |

(Continued)

OTHER PUBLICATIONS

LdapWiki. "Secure Element", pp. 1-2. https://ldapwiki.com/wiki/Secure%20Element. Retrieved Apr. 26, 2020.*

*Primary Examiner* — Lisa C Lewis
(74) *Attorney, Agent, or Firm* — Reches Patent

(57) ABSTRACT

A mobile wallet for storing a digital asset, the mobile wallet may include a communication unit; a programmable logic device (PLD), a main controller, a secure element, and an anti-tamper unit that comprises one or more anti-tamper sensors. The secure element may be configured to store the digital asset. The communication unit may be configured to receive ingress traffic from outside the mobile wallet and to output egress traffic not blocked by the PLD. The PLD may be configured to monitor ingress traffic and egress traffic, and to determine whether to pass or block ingress messages of the ingress traffic and egress messages of the egress traffic. At least one of the main controller and the anti-tamper unit may be configured to detect a tamper attempt based on outputs of the one or more anti-tamper sensors. The main controller may be configured to assist in responding to a detected tamper attempt.

19 Claims, 23 Drawing Sheets

(56) References Cited

U.S. PATENT DOCUMENTS

| | | | | |
|---|---|---|---|---|
| 2002/0080784 A1* | 6/2002 | Krumel | H04L 63/0209 | 370/389 |
| 2004/0113782 A1* | 6/2004 | Auerbach | G08B 13/149 | 340/568.1 |
| 2008/0042809 A1* | 2/2008 | Watts | B60R 25/1003 | 340/426.16 |
| 2008/0303632 A1* | 12/2008 | Hammad | G06F 1/1616 | 340/10.1 |
| 2009/0026751 A1* | 1/2009 | Rancien | G06K 19/005 | 281/29 |
| 2011/0032211 A1* | 2/2011 | Christoffersen | G06F 3/0414 | 345/174 |
| 2011/0120764 A1* | 5/2011 | Kelley | H01L 23/573 | 174/377 |
| 2012/0123937 A1* | 5/2012 | Spodak | G06K 19/06187 | 705/41 |
| 2012/0240185 A1* | 9/2012 | Kapoor | H04L 63/1425 | 726/1 |
| 2013/0246258 A1* | 9/2013 | Dessert | G06Q 20/40 | 705/41 |
| 2014/0129438 A1* | 5/2014 | Desai | G06Q 20/08 | 705/41 |
| 2014/0279479 A1* | 9/2014 | Maniar | G06Q 20/36 | 705/41 |
| 2015/0310432 A1* | 10/2015 | Pusuluri | G06Q 40/02 | 705/71 |
| 2015/0326532 A1* | 11/2015 | Grant | H04L 63/0218 | 726/1 |
| 2016/0104151 A1* | 4/2016 | Tunnell | G06Q 20/341 | 705/41 |
| 2016/0210626 A1* | 7/2016 | Ortiz | G06Q 20/023 | |
| 2017/0017958 A1* | 1/2017 | Scott | G06Q 20/40 | |
| 2017/0091492 A1* | 3/2017 | Brodsky | H05K 1/0275 | |
| 2017/0289159 A1* | 10/2017 | Adrangi | H04W 12/08 | |

* cited by examiner

METHOD FOR SECURING DIGITAL CURRENCY

BACKGROUND

Electronic currencies are spreading in the world and their use is growing steadily. Many merchants accept payments in Bitcoin currency—the leading electronic currency today. Bitcoin and other similar currencies require users to retain a unique random number (private key) which enables to receive and send payments to other users. Essentially, this private key is the user's account in the electronic currency network and must be kept secret, because anyone in possession of the private key can steal the money from the user with a few keystrokes. Protection of the private key is great challenge in the electronic currency ecosystem and slows the adoption of the electronic currency by the average user.

There are several approaches to the protection of the user's private key with various degrees of success. Today almost every electronic currency company offers online wallet service, that stores user's key in the central secure location behind layers of security. This solution is very convenient to the user but requires trust in the third party competence and integrity. Even then malicious party can overcome all defenses and steal the key, as have happened many times in the past.

The user can store his key in the local storage and choose between usability and safety. There are many wallet applications for PC and mobile devices which store the key on the device and are vulnerable to many kinds of attacks. The key can be stored on the offline PC without internet connection in encrypted form, so that any money spending requires multiple steps to generate transaction and is very cumbersome to the average user. Another relatively new solution is stand-alone hardware wallet with proprietary code, which is not vulnerable to the regular operating systems attacks. However, current products lack severely in the security of the hardware and embedded software and are wide open to the sophisticated and well-known side-channel attacks and remote attacks over the network. Private key protection in digital currencies is crucial compared to the regular bank accounts or credit cards, because the transactions cannot be reversed and the users are anonymous and untraceable.

SUMMARY

There may be provide a mobile wallet for storing a digital asset, the mobile wallet may include a communication unit; a programmable logic device (PLD); a main controller; and a secure element. Wherein the secure element may be configured to store the digital asset. Wherein the communication unit may be configured to receive ingress traffic from outside the mobile wallet and to output egress traffic not blocked by the PLD. Wherein the PLD may include a PLD machine learning module and a PLD firewall. Wherein the PLD machine learning module may be configured to detect an anomaly in at least one out of the ingress traffic and the egress traffic, and to send an anomaly indication to at least one out of the PLD firewall and the main controller. Wherein the PLD firewall may be configured to apply firewall rules on the ingress traffic and on the egress traffic. Wherein one or more entity of the main controller and the PLD firewall may be configured to assist in performing an anomaly alert responsive action in response to the anomaly indication.

The PLD firewall may be configured to inform the main controller about the anomaly when the firewall rules are not set to block a propagation of traffic that includes the anomaly.

The PLD machine learning module may be unaware of the firewall rules.

The PLD machine learning module may be configured to learn patterns of valid ingress traffic and patterns of valid egress traffic and to detect the anomaly as a deviation from the at least one of the patterns of valid ingress traffic and patterns of valid egress traffic.

The main controller may be configured to assist in performing an anomaly alert responsive action by shutting down the communication unit.

The main controller may be configured to assist in performing an anomaly alert responsive action by instructing a power management unit of the mobile wallet to shut down the mobile wallet.

The main controller may be configured to assist in performing an anomaly alert responsive action by deleting at least one message that caused the anomaly.

The main controller may be configured to assist in performing an anomaly alert responsive action by deleting at least one message that caused the anomaly.

The PLD firewall may be configured to determine to send an ingress message to the main controller, scramble the message to provide a scrambled message and send the scrambled message to the main controller; wherein the main controller may be configured to unscramble the scrambled message.

The PLD firewall may be configured scramble the message to provide a scrambled message and send the scrambled message using a true random number generator (TRNG) of the PLD, and wherein the main controller may be configured to unscramble the scrambled message using a TRNG of the main controller.

The mobile wallet may be configured to assist in inducing a user to receive a password, wherein a volatile memory of the mobile wallet may be configured to store the password, wherein a cryptography entity of the mobile wallet may be configured to generate a cryptography key and to encrypt a cryptography key with the password to provide an encrypted key; wherein the mobile wallet may be configured to delete the password and to store the encrypted key in at least one memory module.

The encryption entity may be the secure element, the secure element being an integrated circuit.

The mobile wallet may be configured to assist in inducing a user to receive a password, wherein the volatile memory of the mobile wallet may be configured to store the password, wherein the cryptography entity may be configured to decrypt the encrypted key using the password to provide the cryptography key, and to perform a cryptography operation using the cryptography key; and wherein the mobile wallet may be configured to delete the password.

The cryptography operation may be executed during a secure ledger transaction.

The communication unit may be configured to exchange information with a mobile communication device during one or more phases of an execution of a secure ledger transaction.

The communication unit may be configured to receive transaction parameters of a new transaction from a mobile communication device; wherein the communication unit may be configured to retrieve information about one or more previous transactions of a user that include enough funds to complete the new transaction; wherein the main controller may be configured to instruct a man machine interface of the mobile wallet to induce the user to confirm the transaction parameters; wherein the man machine interface may be configured to receive a conformation from the user; wherein the main controller may be configured, after receiving the confirmation from the user to generate a request to execute the new transaction; wherein a cryptography entity of the mobile wallet may be configured to digitally sign the request to execute the new transaction to provide a digitally signed request; wherein the communication unit may be configured to send the digitally signed request to the mobile communication device, and to receive from the mobile communication device a confirmation of a secure ledger network of the new transaction.

The communication unit may be configured to retrieve from the mobile communication device the information about the one or more previous transactions of the user.

The communication unit may be configured to retrieve, without accessing the mobile communication device, the information about the one or more previous transactions of the user.

The transaction parameters are a price, a recipient and a commission.

The mobile wallet may include at least one anti-tamper sensors.

The mobile wallet may include a biometric sensor.

The mobile wallet may include a fingerprint reader for authentication of a user.

The mobile wallet may include a display.

The display may be configured to display a name of a recipient and an amount of funds to be transferred to the recipient; wherein the display may be configured to receive an approval of the user of a transaction that involves transferring the amount of funds to the recipient; and wherein the communication unit may be configured to sent information about the approval to a mobile communication device.

The display may be configured to display a name of a recipient and an amount of funds to be transferred to the recipient; wherein another man machine interface of the mobile wallet may be configured to receive an approval of the user of a transaction that involves transferring the amount of funds to the recipient; and wherein the communication unit may be configured to send information about the approval to a mobile communication device.

The communication unit may be configured to receive an updated code from a mobile communication device; wherein the PLD may be configured to scramble the updated code to provide a scrambled code and to send the scrambled code a non-volatile memory of the mobile wallet; wherein a cryptography entity of the mobile wallet may be configured to calculate a hash of the scrambled code; wherein a display of the mobile wallet may be configured to display the hash; wherein a man machine interface of the mobile wallet may be configured to receive an conformation of a user, following the display of the hash; and wherein upon reception of the approval, the mobile wallet may be configured to descramble the scrambled code and to replace the scrambled code stored in the non-volatile memory with the code.

There may be provided a mobile wallet for storing a digital asset, the mobile wallet may include a communication unit; a programmable logic device (PLD); a main controller; a secure element; and an anti-tamper unit that may include one or more anti-tamper sensors; wherein the secure element may be configured to store the digital asset; wherein the communication unit may be configured to receive ingress traffic from outside the mobile wallet and to output egress traffic not blocked by the PLD; wherein the PLD may be configured to monitor ingress traffic and egress traffic, and to determine whether to pass or block ingress messages of the ingress traffic and egress messages of the egress traffic; wherein at least one of the main controller and the anti-tamper unit may be configured to detect a tamper attempt based on outputs of the one or more anti-tamper sensors; wherein the main controller may be configured to assist in responding to a detected tamper attempt.

The mobile wallet may include a board and the anti-tamper unit may include a cage; wherein the board may be coupled to the PLD and to the main controller, wherein the cage may be electrically coupled to interior conductive elements of the board thereby providing an electromagnetic shield that surrounds the PLD and the main controller.

The mobile wallet further may include a sealing layer that covers the cage, an upper surface of the board and the communication unit.

The sealing layer and the board are surrounded by an integrity sensor.

The interior conductive elements of the board may include a conductive layer that may be positioned between non-conductive layers of the board, and conducting vias that extend between the conductive layer and an upper surface of the board.

The one or more anti-tamper sensors are positioned within the cage.

The mobile wallet the anti-tamper unit may include at least one additional anti-tamper sensors that may be positioned outside the cage.

The one or more anti-tamper sensors may include a temperature sensor that may be configured to sense a heating resulting from an attempt to unweld one or more conductors of the mobile wallet.

The one or more anti-tamper sensors may include a light sensor that may be configured to detect a breach in the cage.

The one or more anti-tamper sensors may include a magnetic sensor that may be configured an attempt to disrupt the operation of the mobile wallet using a strong magnetic field.

The one or more anti-tamper sensors may include an accelerometer that may be configured to sense an attempt to break the mobile wallet.

The main controller may be configured to assist in responding to the tamper alert by shutting down the mobile wallet.

The main controller may be configured to assist in responding to the tamper alert by erasing a content of one or more volatile memory units of the mobile wallet.

The anti-tamper unit may include an anti-tamper controller that may be coupled between the main controller and the one or more anti-tamper sensors; wherein the anti-tamper controller may be configured to determine whether a tamper attempt occurred, and when a tamper attempt occurs to notify the main controller.

The PLD may include a PLD machine learning module and a PLD firewall; wherein the PLD machine learning module may be configured to detect an anomaly in at least one out of the ingress traffic and the egress traffic, and to send an anomaly indication to at least one out of the PLD firewall and the main controller; wherein the PLD firewall may be configured to apply firewall rules on the ingress traffic and on the egress traffic; wherein one or more entity of the main controller and the PLD firewall may be configured to assist in performing an anomaly alert responsive action in response to the anomaly indication.

There may be provided a method, that may include storing a digital asset in a secure element of a mobile wallet; receiving, by a communication unit of the mobile wallet, ingress traffic from outside the mobile wallet; wherein the mobile wallet comprises a programmable logic device (PLD) and a main controller; sending the ingress traffic to a PLD machine learning module of the PLD and to a PLD firewall of the PLD; applying, by the PLD firewall, firewall rules on the ingress traffic; searching, by the PLD machine learning module, for an anomaly in the ingress traffic and the egress traffic; when an anomaly is detected sending an anomaly indication to at least one out of the PLD firewall and the main controller; and assisting, by one or more of the main controller and the PLD firewall, in performing an anomaly alert responsive action in response to the anomaly indication.

There may be provided a non-transitory computer readable medium that stores instructions for storing a digital asset in a secure element of a mobile wallet; receiving, by a communication unit of the mobile wallet, ingress traffic from outside the mobile wallet; wherein the mobile wallet comprises a programmable logic device (PLD) and a main controller; sending the ingress traffic to a PLD machine learning module of the PLD and to a PLD firewall of the PLD; applying, by the PLD firewall, firewall rules on the ingress traffic; searching, by the PLD machine learning module, for an anomaly in the ingress traffic and the egress traffic; when an anomaly is detected sending an anomaly indication to at least one out of the PLD firewall and the main controller; and assisting, by one or more of the main controller and the PLD firewall, in performing an anomaly alert responsive action in response to the anomaly indication.

There may be provided a method that may include storing a digital asset by a secure element of a mobile wallet; sensing, by an anti-tamper unit of the mobile wallet, a tamper attempt; wherein the anti-tamper unit may include one or more anti-tamper sensors; detecting, by at least one of the main controller and the anti-tamper unit, a tamper attempt based on outputs of the one or more anti-tamper sensors; assisting, by a main controller of the mobile wallet, in responding to the tamper attempt; receiving, by a communication unit of the mobile wallet ingress traffic from outside the mobile wallet; outputting egress traffic not blocked by a programmable logic device (PLD) of the mobile wallet; monitoring, by the PLD, ingress traffic and egress traffic; determining by the PLD, whether to pass or block ingress messages of the ingress traffic and egress messages of the egress traffic.

There may be provided a non-transitory computer readable medium that stores instructions for storing a digital asset by a secure element of a mobile wallet; sensing, by an anti-tamper unit of the mobile wallet, a tamper attempt; wherein the anti-tamper unit may include one or more anti-tamper sensors; detecting, by at least one of the main controller and the anti-tamper unit, a tamper attempt based on outputs of the one or more anti-tamper sensors; assisting, by a main controller of the mobile wallet, in responding to the tamper attempt; receiving, by a communication unit of the mobile wallet ingress traffic from outside the mobile wallet; outputting egress traffic not blocked by a programmable logic device (PLD) of the mobile wallet; monitoring, by the PLD, ingress traffic and egress traffic; determining by the PLD, whether to pass or block ingress messages of the ingress traffic and egress messages of the egress traffic.

BRIEF DESCRIPTION OF THE DRAWINGS

The present invention will be understood and appreciated more fully from the following detailed description taken in conjunction with the drawings in which.

DETAILED DESCRIPTION OF THE DRAWINGS

Figure 1:
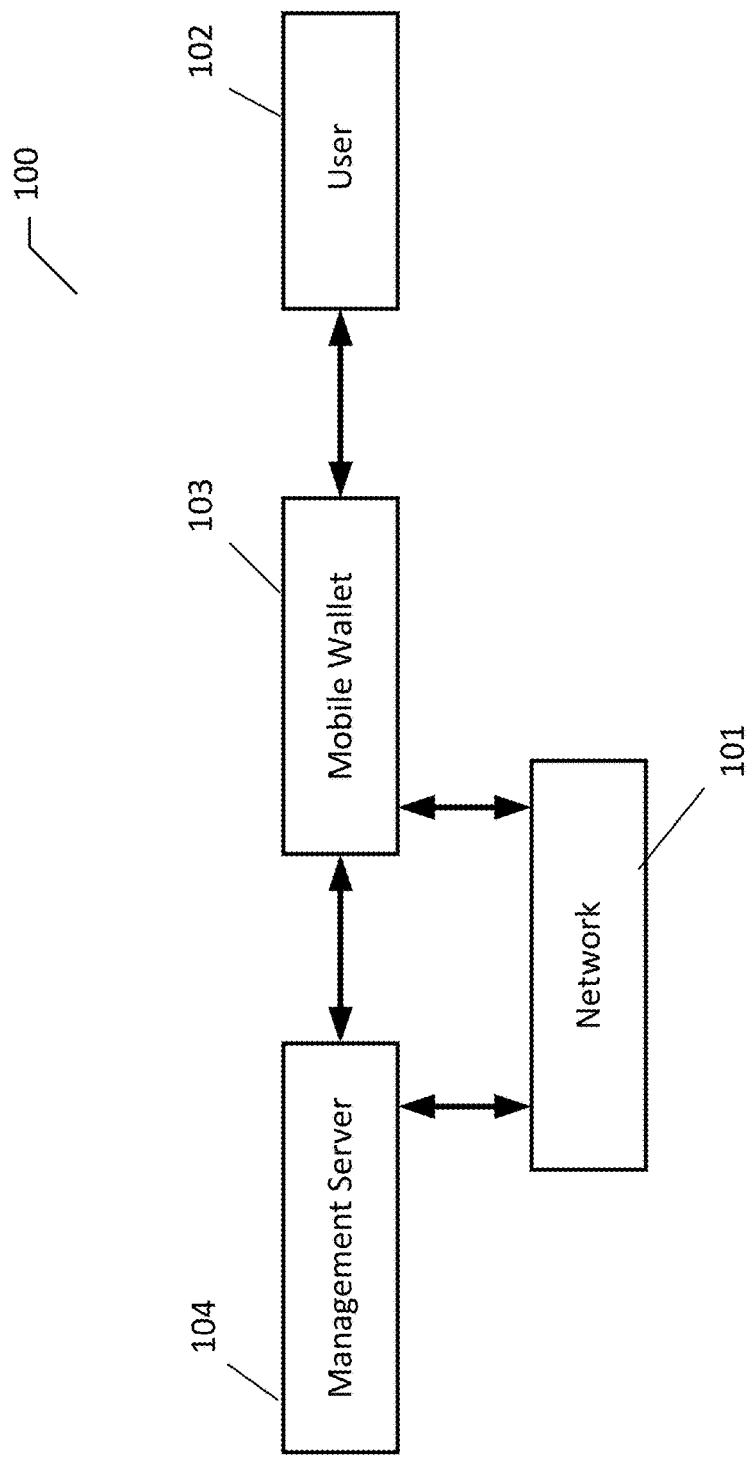
FIG. 1 is an example of the mobile wallet and its surroundings.

Any reference to a system should be applied, mutatis mutandis to a method that is executed by a system and/or to a non-transitory computer readable medium that stores instructions that once executed by the system will cause the system to execute the method.

Any reference to method should be applied, mutatis mutandis to a system that is configured to execute the method and/or to a non-transitory computer readable medium that stores instructions that once executed by the system will cause the system to execute the method.

Any reference to a non-transitory computer readable medium should be applied, mutatis mutandis to a method that is executed by a system and/or a system that is configured to execute the instructions stored in the non-transitory computer readable medium.

The term "and/or" is additionally or alternatively.

The terms "comprising", "Consisting" and "consisting essentially of are used in an interchangeable manner.

For example—a system that is illustrated as including certain units and/or components may (a) include additional units and/or components, (b) may include only the certain units and/or components, or (c) may include the certain units and/or components and additional units and/or components that do not materially affect the basic and novel characteristic(s)" of the claimed invention.

Yet for another example—a method that is illustrated as including certain steps may (a) include additional steps, (b) may include only the certain steps, or (c) may include the certain steps and additional steps that do not materially affect the basic and novel characteristic(s)" of the claimed invention.

Yet for another example—a non-transitory computer readable medium that is illustrated as storing certain instructions may (a) store additional instructions, (b) may store only the certain instructions, or (c) may store certain instructions and additional instructions that do not materially affect the basic and novel characteristic(s)" of the claimed invention.

Because the systems implementing the present invention is, for the most part, composed of electrical components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

In the following specification, the invention will be described with reference to specific examples of embodiments of the invention. It will, however, be evident that various modifications and changes may be made therein without departing from the broader spirit and scope of the invention as set forth in the appended claims.

The subject matter is described with reference to the drawings, where numerals aid to reference different elements. This description contains numerous details and implementation examples in order to provide thorough understanding of the innovation. However, the subject matter can be implemented without these specific details. Terms "component", "device", "module", "wallet" and others refer to one or more of the entities: software, hardware or firmware. For example, a module can be implemented with software running on specific hardware, in order to implement its task. Additionally, "user", as mentioned in this document, can be a human being and/or machine implemented in software and/or hardware. The terms "private key", "Key", "wallet key", "cryptography key" are identical in their meaning.

A mobile wallet is provided. It may also be referred as a mobile device or a device.

The mobile wallet may include a programmable logic device (PLD) such as but not limited to a field programmable gate array (FPGA) or programmable ASIC.

A programmable logic device (PLD) is an electronic component used to build reconfigurable digital circuits. Unlike a logic gate, which has a fixed function, a PLD has an undefined function at the time of manufacture. Before the PLD can be used in a circuit it must be programmed, that is, reconfigured.

The subject matter can be implemented with hardware (e.g. PLD, ASIC, GPU, microcontroller) that may execute software, code, instructions and firmware, the hardware may be manufactured using any production technique and in any form-factor (e.g., card, stick, PC, phone, monitor, watch, . . . ). Furthermore, communication between any parts of the mobile wallet can use variety of medium, such as wireless (e.g., BT, NFC, WiFi, GSM, UMTS, LTE, . . . ) or wired (LAN, ADSL, dialup modem, USB, PCIe, . . . ) communication standards or non-standard protocols.

The term "ingress traffic" refers to traffic (information, code) from outside the mobile device that proceeds towards the mobile device. Ingress traffic may also refer to traffic from the unsecured portion of the mobile device to the secured portion of the mobile device.

The term "egress traffic" refers to traffic (information, code) from the mobile device that proceeds outside the mobile device. Egress traffic may also refer to traffic from the secured portion of the mobile device to the unsecured portion of the mobile device.

FIG. 1 illustrates a mobile wallet 103 that facilitates digital currency management and transactions. Mobile wallet 103 may be accessed by a user 102. The mobile wallet 103 may be coupled over a network 101 to a management server that enables transaction authentication and public transactions ledger.

The network 101 may include or may be coupled to various computerized entities such as one or more computers, servers, a secure ledger, miners. The network may be a blockchain network or another network. The mobile wallet 103 can connect to the network 101 in order to receive transaction history data, send new transactions to be authenticated or pass in both directions any other data needed for the mobile wallet 103 operation. For example, mobile wallet 103 can query transaction fee from the network 101. Additionally, mobile wallet 103 can communicate with the management server 104 in order to enable the same functionality as with the network 101 and/or additional management functions. For example, mobile wallet 103 can get software updates from the management server by any communication medium. Any communication with the management server 104 may apply authentication and encryption methods.

Additionally, mobile wallet 103 can communicate directly with any other mobile wallet over any communication medium in order to generate transactions for the digital currency transfer.

Mobile wallet 103 can be any suitable device that can implement the required wallet functionality and communicate with the external devices, such as, but not limited to, a cellular device, handheld terminal, gaming device, smartphone, credit card, USB stick, etc. Additionally, Mobile Wallet 103 can be physically embedded in a device.

Mobile wallet 103 can be used to store any number of digital currency wallets and any data related to the digital currency, wallet user and/or normal functions of the mobile wallet. For example, mobile wallet can store digital currency exchange rates and user contacts address book to facilitate transaction generation.

Mobile wallet 103 can interact with the user 102 in order to implement wallet handling and transaction generation. Communication between mobile wallet 103 and the user 102 can be by any means available, such as, but not limited to, keys, screen, camera, proximity sensor, fingerprint reader, capacitive interface, USB, LAN, WiFi, BT, any other biometric interface, etc. The user 102 can initiate the transaction, approve transaction recipient, wipe personal data from the mobile wallet 103, etc.

In addition, any suitable interface components (adapters, connectors, channels, etc.) can be provided in order to enable interaction between the mobile system 100 and any other component and/or user, and for direct interaction between components from multiple instances of mobile wallet 103.

Figure 2:
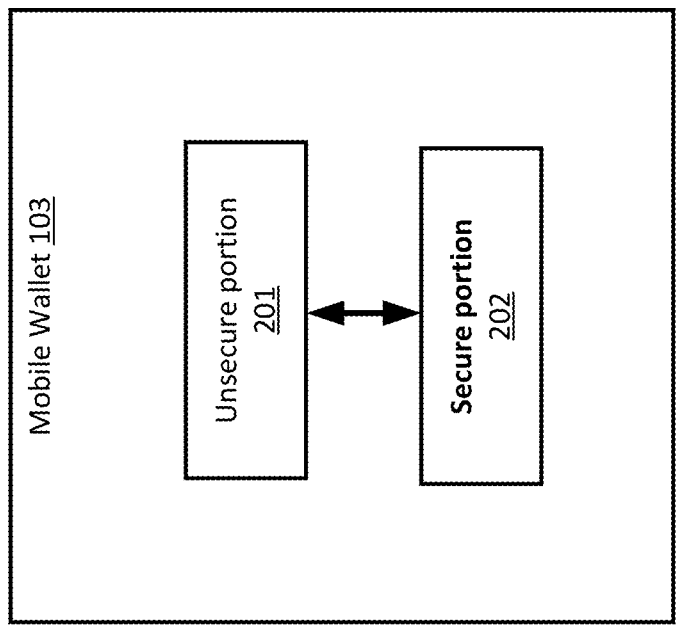
FIG. 2 is an example of a mobile wallet.

FIG. 2 illustrates an internal structure of mobile wallet 103 that enhances security of the wallet component. The mobile wallet 103 includes the following components: unsecure portion 201 and secure portion 202. These portions may include one or more hardware components. They may also include software and/or firmware and/or middleware that are executed by the one or more hardware components. The portions may be provided jointly in the same module or as physically separated modules. Portions 201 and 202 together implement at least some of the functionality of the mobile wallet 103. The separation described herein enables better security and flexibility in the implementation.

For example, unsecure portion 201 can handle all communication with the external entities, such as components 101-104, by any channels of communication. Secure portion 202 may handle all aspects of the mobile wallet 103, which require enhanced security, such as, but not limited to, users private key storage, transaction generation, users transaction history storage, user authentication, communication encryption. Furthermore, unsecure portion 201 can be a part of another existing component, such as, but not limited to, smartphone, computer, watch.

Secure portion 202 can implement multiple security measures in order to enhance protection of the functionality and data. For example, mobile wallet 103 can include tamper-evident coating and/or seals that have to be broken to get access to the secure portion 202.

Furthermore, physical protection of the secure portion 202 can include intrusion detection and/or secret data wipe mechanisms and/or monitoring environmental conditions for indications of intruder attack. The intrusion detection and/or monitoring of environmental conditions for indication of intruder attack may include one or more anti-tamper sensors. A dedicated anti-tamper controller may be used for processing the detection signals from the one or more anti-tamper sensors. The anti-tamper detection can also be executed by a controller (such as main controller 304 of FIG. 3) that also performs additional functions.

Figure 3:
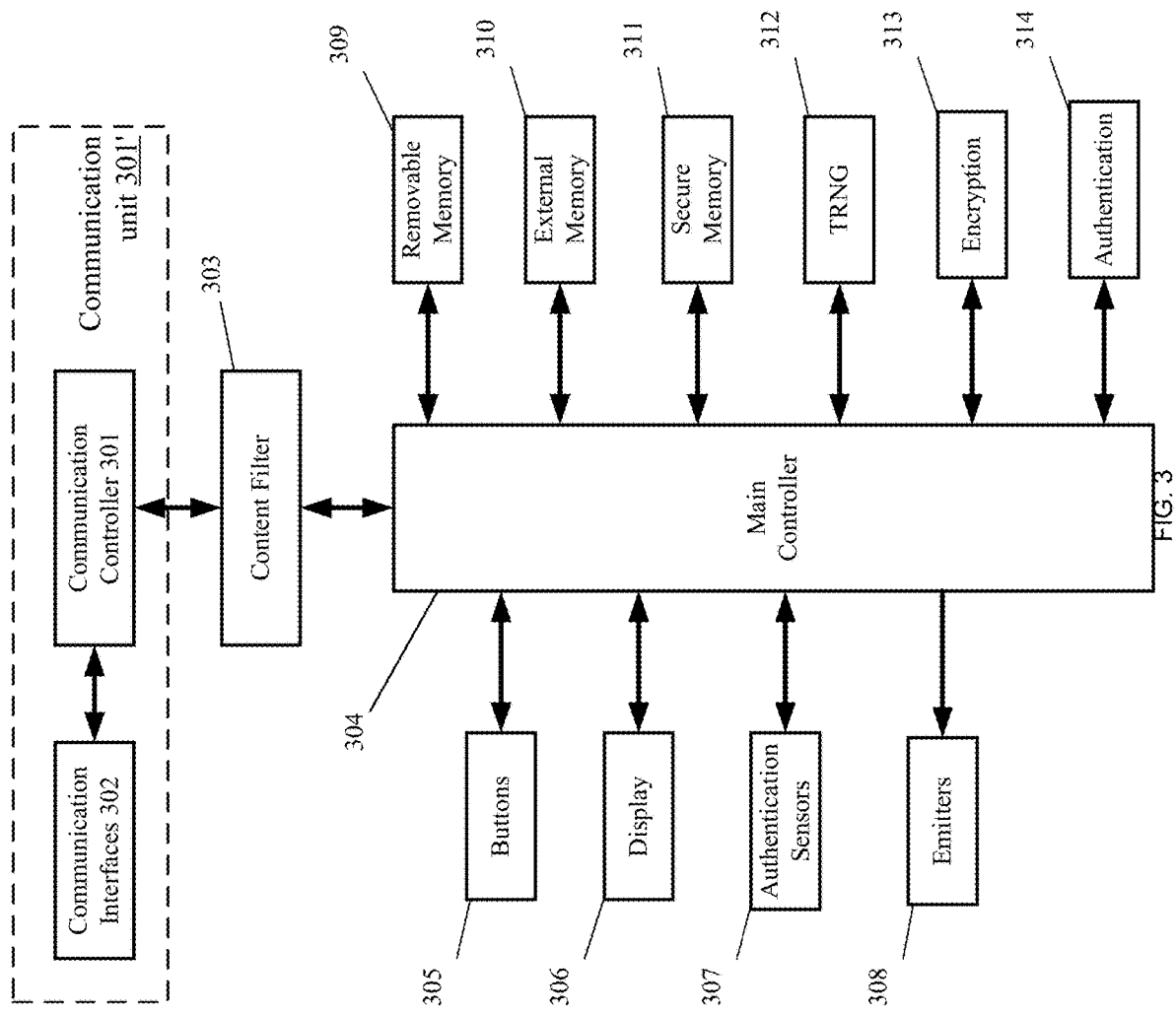
FIG. 3 is an example of a mobile wallet.

FIG. 3 illustrates internal structure of mobile wallet 103. Unsecure portion 202 may include a communication unit 301' that may include communication interface 302 and communication controller 301. The content filter 303 defined the border between unsecure portion 201 and secure portion. Communication controller 301 is responsible for providing and maintaining connection to external devices by means of various communication interfaces 302 (e.g. BT, WiFi, USB, NFC, LAN, RS232, cellular, audio). The communication controller 301 may not be required to have security measures or special protection and provides data transfer service to the other components of the secure portion 202.

Communication controller 301 can handle variety of standard protocols (e.g. IP, cellular) and/or any method of data transmitting and receiving. Communication controller 301 can use several communication interfaces and protocols at the same time.

Content filter 303 can be responsible for the validity of the communication data in both directions (to and/or from communication controller 301). Content filter 303 should prevent unauthorized data flow to the main controller 304 and/or from the main controller 304, using variety of processes.

For example, content filter 303 can check specific values of fields in the data against existing dictionary of the allowed values or check whether specific fields in the data satisfy predefined criteria (e.g. are in the specific range of numeric values) or check for the data structure against predefined template or check the data packets order and timing against predefined parameters. If the data packet or packets do not pass content filter 303 tests, then the whole packets are deleted and are not passed to the destination. Content filter 303 may include one or more hardware components. The content filter 303 may also include software and/or firmware and/or middleware executed by the one or more hardware components, and can be part of another existing device.

Content filter 303 connectivity to other modules can use a variety of physical interfaces (e.g. SPI, RS323, LAN, BT) and communication protocols.

Figure 4:
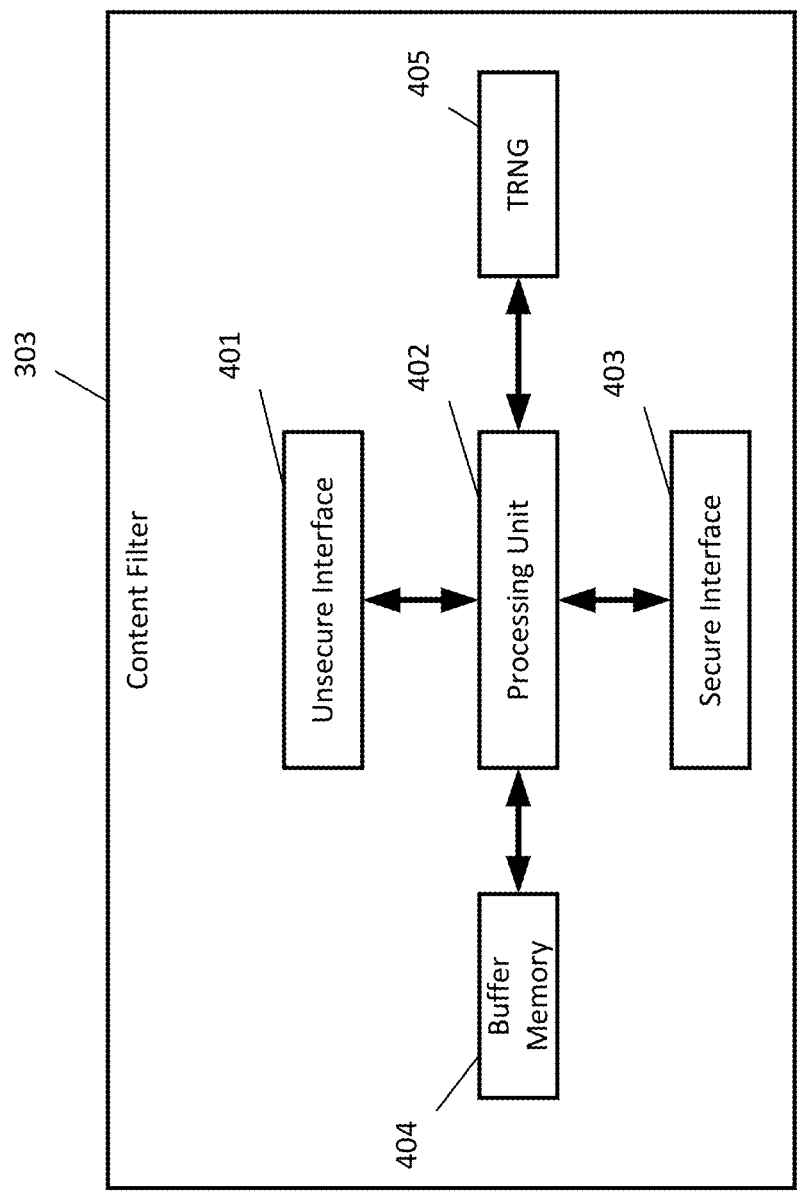
FIG. 4 is an example of a content filter of the mobile wallet.

FIG. 4 illustrates the internal structure of the content filter 303 that may include a processing unit such as a central processing unit (CPU) for bi-directional data processing, buffer memory 404 for storage of the processed data and/or any other information needed for the functionality of the content filter 303 (e.g. data templates, allowed values).

Additionally, content filter 303 can have two separate connectivity interfaces: unsecure interface 401 for the connection to the non-secure devices and secure interface 403 for connection to the protected devices. Each of the interfaces 401 and 403 can be implemented as a separate hardware and/or software modules, or both interfaces can share the same hardware and/or software modules. Any number of devices can be connected at the same time to each of the interfaces 401 and/or 403. Buffer memory 404 can be separate hardware module or share hardware with any other module of the content filter.

Content filter 303 can also include true random number generator 405 (TRNG) to enhance system security. The purpose of the TRNG 405 is generation of random numbers with any number of digits and sending them to the processing unit 402.

Processing unit 402 can use the random numbers for additional protection of the main controller 304, for example by scrambling all data passed to the main controller with random numbers to prevent malicious code injection. The scrambling can be implemented with a variety of algorithms in software and/or hardware, as long as the original data can be decoded by a reverse descrambler algorithm.

For example, one such scrambler can apply XOR operation between the original data and random sequence in order to output random encoded data.

The receiver (e.g. main controller 304) applies the XOR operation between the encoded data and the same random sequence, in order to get the original data. Any malicious data injected into the main controller 304 turns into random data after XOR operation in the main controller 304. The content filter in FIG. 4 can be implemented with a variety of techniques on different hardware (e.g. PLD, ASIC, microcontroller) and software components, while keeping the core innovation idea.

Figure 5:
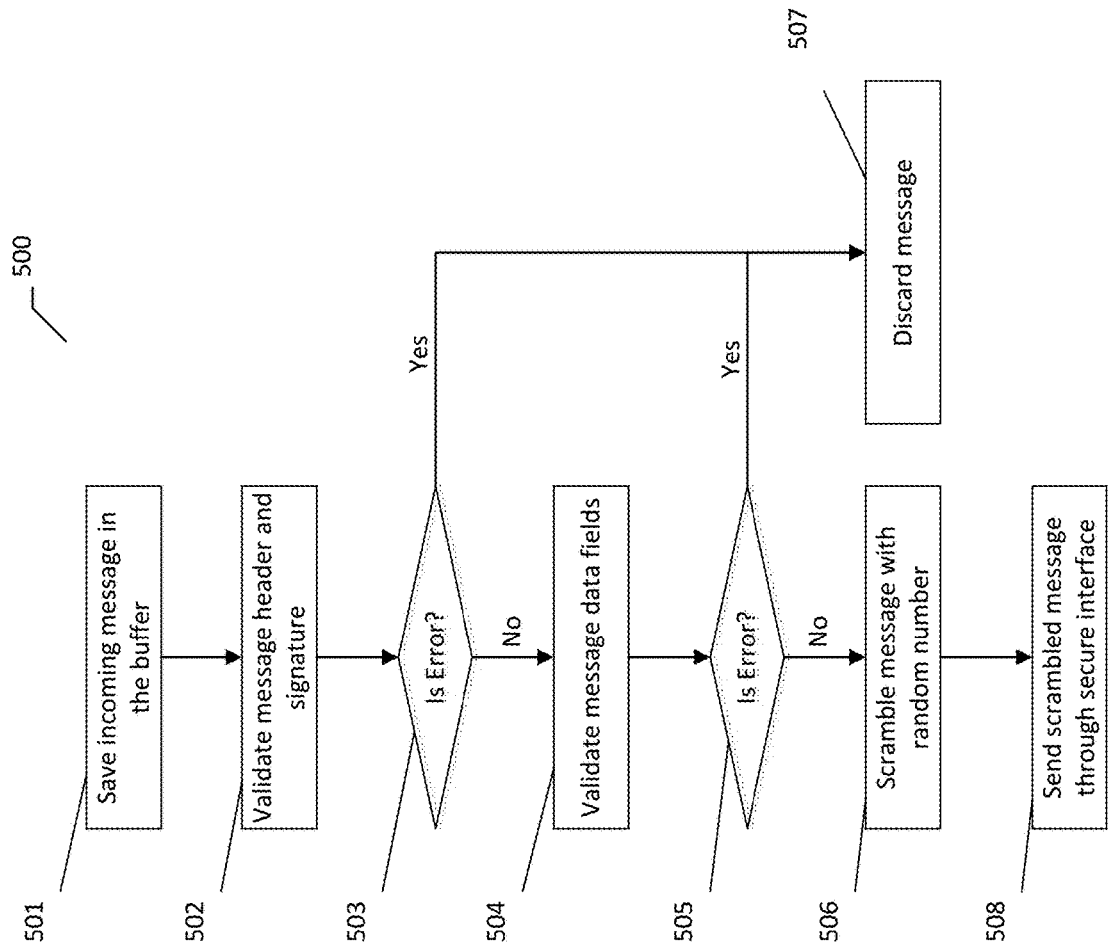
FIG. 5 is an example of a method.

FIG. 5 illustrates process for data filtering by the content filter 303 with the example internal structure from FIG. 4. The process in FIG. 5 defines filtering in the direction from unsecure interface 401 to secure interface 403, however similar process can be applied to the filtering of data in the direction from secure interface 403 to unsecure interface 401. The process 500 begins when new data in the form of a message is received on the unsecure interface 401.

Step 502 can be the first stage of the filtering process and can include validation of known message components, e.g. message header and message signature. Validation of known message components can be based on the unique properties of each component, e.g. length in bytes, range of values, type, output of a mathematical formula.

Step 502 results can be checked in the step 503 for error notifications and the appropriate action can be taken. If errors are detected in step 502, then tested data can be discarded in step 507.

If step 502 did not find any errors, then step 504 can test message data payload for validity using a variety of techniques, e.g. range of values, output of mathematical formula, relations between data fields. Step 504 results can be checked in the step 505 for error notifications and the appropriate action can be taken. If errors are detected in step 504, then tested data can be discarded in step 507.

If step 504 did not find any errors, then step 506 can apply scrambling algorithm to the entire message, for example using random numbers generated by TRNG 405 by XOR function. Then the entire message can be sent to the secure interface 403 in step 508. Those skilled in the art will recognize many possible modifications to the system 400 or process 500 in the spirit of the subject matter described herein.

Back to FIG. 3, the mobile wallet 103 can include main controller 304 that can be responsible for the various functions of the wallet, e.g. private key generation and secure storage, transaction generation, history management, user authentication. There can be many possible functions for the wallet, to be implemented in various methods, while remaining in the scope of the subject matter. The main controller 304 and/or any module of 305 to 314 may include one or more hardware components. They may also include software and/or firmware and/or middleware that are executed by the one or more hardware components.

The main controller 304 can have different types of memories: removable memory 309, external memory 310 and secure memory 311.

Main controller 304 can read from and/or write to any memory 309 to 311. Data on any memory can be stored in encrypted format by the main controller 304.

Removable memory 309 can be a separate physical module that can be removed and replaced by a user, and contains various data elements, e.g. user private key, wallet identification.

Removable memory 309 can be used to backup important data as a protection from loss or malfunction of the wallet. External memory 310 can retain various data elements in nonvolatile medium (flash, magnetic storage, tape), e.g. transaction history, user data. External memory 310 can serve as a nonvolatile storage of data between system power-offs and can share the hardware with the main controller 304. Secure memory 311 can be used to store most sensitive data, e.g. user passwords or private keys. Secure memory 311 can be protected on hardware level by various methods, such as metal casing, intrusion detection, readout disable.

Main controller 304 can use following modules to enable required wallet functionality (such as transaction generation): TRNG 312, encryption module 313 and authentication module 314.

For example, controller 304 can create new private key number from TRNG 312 output, encrypt the private key using encryption module 313 and store the private key in the secure memory 311. TRNG 312 can use a variety of algorithms for generation of true random numbers. Encryption module 313 can implement many types of encryption algorithms simultaneously in software and/or hardware. Authentication module can be used to authenticate any party (e.g. user, external application, server) using a variety of methods, such as public key cryptography.

Main controller 304 can use various methods of input and/or output of data from the user of the system.

For example, main controller 304 can require user to input password using buttons 305 and display 306 to enable selected functionality of the system. Furthermore, buttons 305 and display 306 can be used to acquire user approval of a new transaction in the secure environment before sending it to the network.

Main controller 304 can use authentication sensors 307 and emitters 308 in many types of applications, including, but not limited to, user authentication by biometric signs (e.g. fingerprints, face recognition), counterfeit protection with tampering detection (e.g. temperature, resistance). Additionally, emitters 308 can be used to decrease the risk for wallet loss or theft by a method of emitting sound and/or vibration and/or light according to a trigger (from external module, main controller 304, timeout event, displacement event). User can find the wallet by sensing this sound and/or vibration and/or light. There can be various security enhancements using different combinations of authentication sensors 307 and emitters 308 in the spirit of the subject matter.

Mobile wallet 103 can implement many processes required for the management of digital currency wallet. Examples of basic processes are Key generation, Key backup and Key restore. Any process can be implemented in hardware and/or software.

Figure 6:
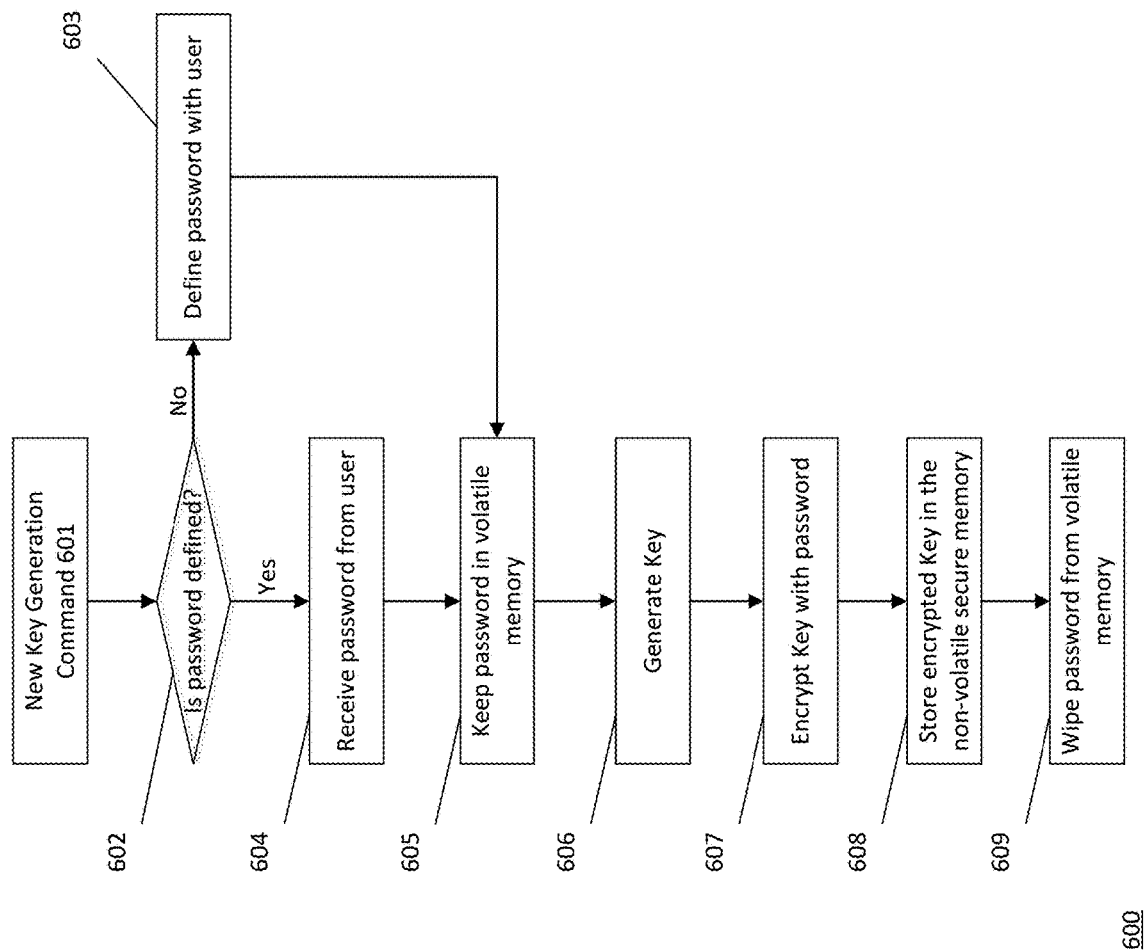
FIG. 6 is an example of a method.

FIG. 6 illustrates Key generation process that can be started on the new wallet event and can include two stages: password generation and Key generation and storage. On the event 601 the system checks if password exists at step 602. If password does not exist in the mobile wallet 103, then user can be given an opportunity to define new password and input it into the mobile wallet 103 at step 603. If there is an existing password, user can be asked to enter the password into the mobile wallet 103 at step 604 in order to proceed. The password can be copied to the volatile memory in mobile wallet 103 at step 605 for temporary storage. The next stage at step 606 can be generation of new Key using, for example, TRNG 312. The new Key can be encrypted using the password at step 607 with the help of encryption module 313. At the next step 608 the encrypted Key can be stored to secure memory 311 for safe-keeping. Lastly, password can be wiped from the volatile memory at step 609.

Figure 7:
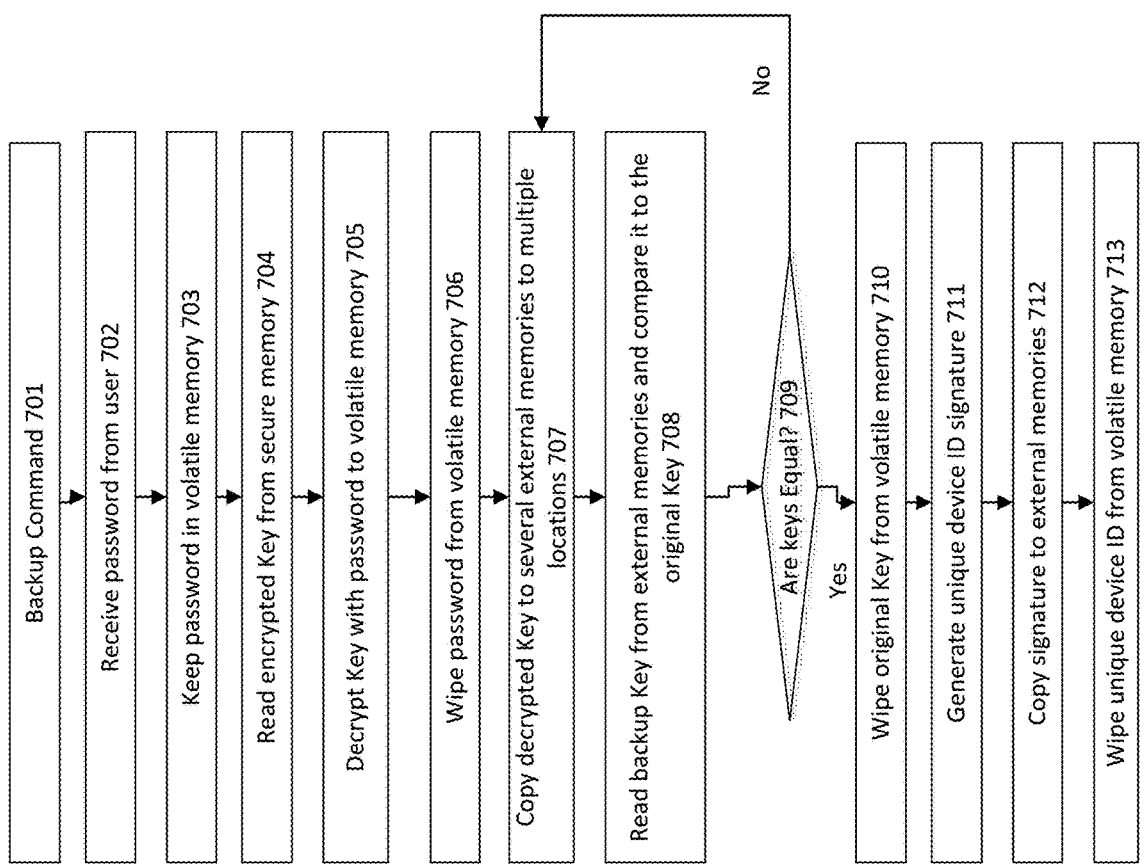
FIG. 7 is an example of a method.

FIG. 7 illustrates Key backup process that can protect user from system failure and/or physical loss or theft.

The process 700 can start with the backup event 701 and getting password from user in step 702 and saving the password in volatile memory of mobile wallet 103 in step 703.

Then encrypted Key can be read from secure memory 311 and decrypted with the password in the encryption module 313 in steps 704 and 705.

After Key decryption, password can be wiped from volatile memory of mobile wallet 103 in step 706 in order to minimize exposure to attacker.

In step 707 decrypted Key can be copied to physically separate removable memories 309 at mobile wallet 103 in order to provide enhanced backup options for user and enable Key storage in different locations. The Key can be copied to multiple locations in each removable memory to handle localized hardware errors.

After each backup the Key can be read back from external memory and compared to the original copy in step 708. If keys are not identical, then in step 709 there can be a return to step 707.

Otherwise, copies are correct, then the original key can be wiped from mobile wallet 103 volatile memory in step 710 in order to minimize exposure to attacker. In steps 711, 712 unique signature for the specific instance of mobile wallet 103 can be generated and copied to all external memories with the keys backups. This enables to prevent the existence of more than one wallet with the same Key and incorrect currency transactions. After copying signature to external memories, the signature can be wiped from mobile wallet 103 volatile memory in step 711. Unique device signature can include error detection and correction data to enable errors correction in Key stored on removable memory.

Figure 8:
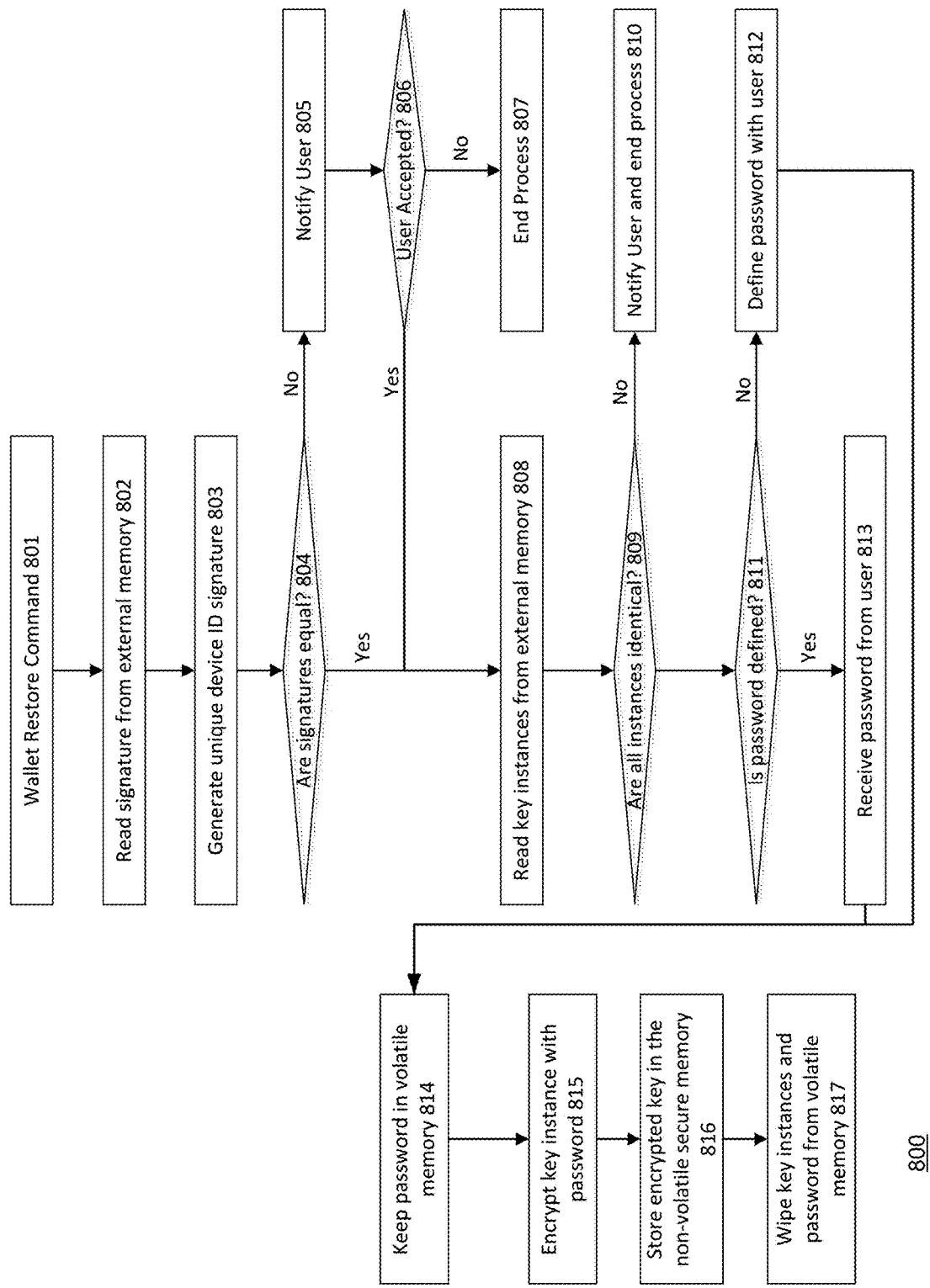
FIG. 8 is an example of a method.

FIG. 8 illustrates process of Key restoration from backup, for example on the event of wallet loss or malfunction.

Process 800 can start with restore event 801, upon which unique signature can be read from the external memory in step 802 and new signature can be generated on the specific instance of mobile wallet 103 in step 803.

In step 804 both signatures can be compared. If signatures are different, then user can be notified in step 805 and asked to decide whether to proceed. If user did not accepted then the process 800 can be terminated at step 807.

If user accepted the difference or both signatures are identical, ten all Key copies can be read from external memory of mobile wallet 103 in step 808 and compared to each other in step 809.

If there are differences between Key copies, then user can be notified and process 800 can be terminated due to inability to use restored Key. If all copies are identical, then the system checks if password exists at step 811.

If password does not exist in the mobile wallet 103, then user can be given an opportunity to define new password and input it into the mobile wallet 103 at step 812. If there is an existing password, user can be asked to enter the password into the mobile wallet 103 at step 813 in order to proceed. The password can be copied to the volatile memory in mobile wallet 103 at step 814 for temporary storage. The restored Key can be encrypted using the password at step 815 with the help of encryption module 313. At the next step 816 the encrypted Key can be stored to secure memory 311 for safe-keeping. Lastly, password and Key can be wiped from the volatile memory at step 817.

Figure 9:
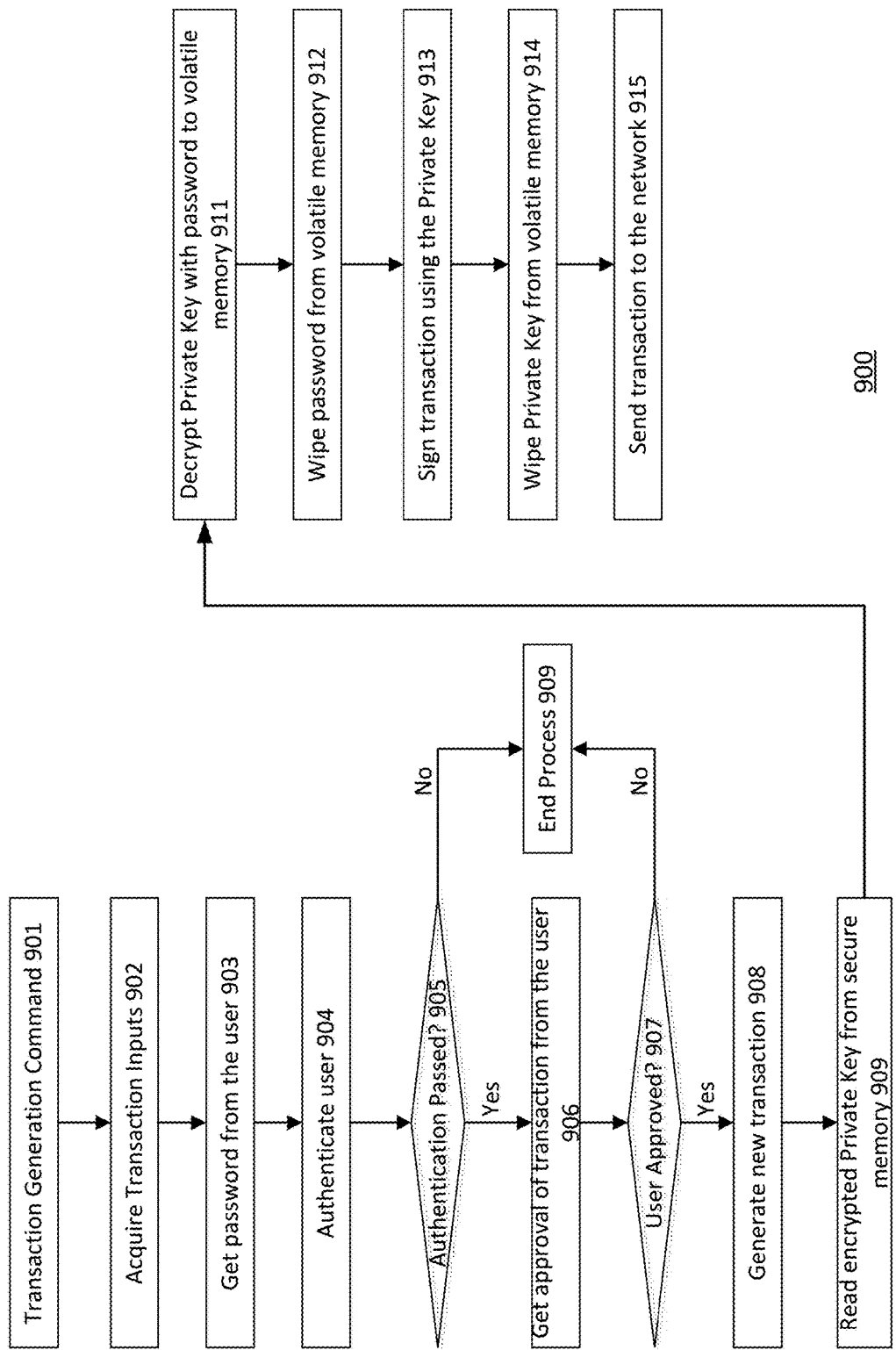
FIG. 9 is an example of a method.

FIG. 9 shows the transaction generation process for the purpose of payment to the third party with digital currency. The main function of the digital wallet is payments to other parties on behalf of the owner. The payment is done by generating digital message, including the transaction description and proof of the owner, for example by a use of cryptographic signature. First step in the transaction generation is to acquire transaction inputs, such as recipient id, sum, money sources. Transaction data can be acquired and analyzed for correctness in step 902.

In step 903 optional password can be acquired from the user for the later use and saved into main controller 304 memory.

Password input by the user can be done in such a way to minimize detection of the password by an attacker. For example, the password can be entered directly to the main controller 304 with the display 306 and buttons 305, or with an external device using scrambling process.

The scrambling process of the password input can be implemented as follows.

First, controller 304 can generate one-time mapping of password possible characters to new set of characters and can output it on the display 306.

The new set of characters can also be displayed on the screen of the device and the user can input the password using the new set of characters.

The controller 304 can map user input to the original set of characters. With this described scrambling method, the password can be kept secret from any attacker with the access to the device.

The user can be passed through authentication process in step 904, for example using fingerprint or iris recognition.

If the authentication fails, then the whole transaction generation process can be stopped.

In step 906 transaction data can be approved by the user in a tamper-protected way, for example by using separate display 306 and buttons 305, so that a remote attacker would not be able to falsify the data. If user does not approve the transaction, then the whole transaction generation process can be stopped.

New transaction can be generated in step 908, except the unique user authentication. Transaction structure and data depends on the specific digital currency protocol, and the wallet can support a variety of digital currencies. In order to generate unique user signature, if needed, Private Key can be read from the secure memory 311 and can be decrypted with the user password into volatile memory of the main controller 304. Then the unique user signature can be generated and appended to the transaction in step 913. The complete transaction can be sent to the network 101 and/or management server 104. Both user password and Private Key can be wiped from the main controller 304 volatile memory when not needed anymore, in order to minimize the risk of exposure to an attacker.

It should be noted that the content filter 303 may include at least one out of a machine learning module (such as but not limited to a neural network) and a firewall. The machine learning module and/or the PLD firewall may or may not be implemented by a PLD.

Figure 10:
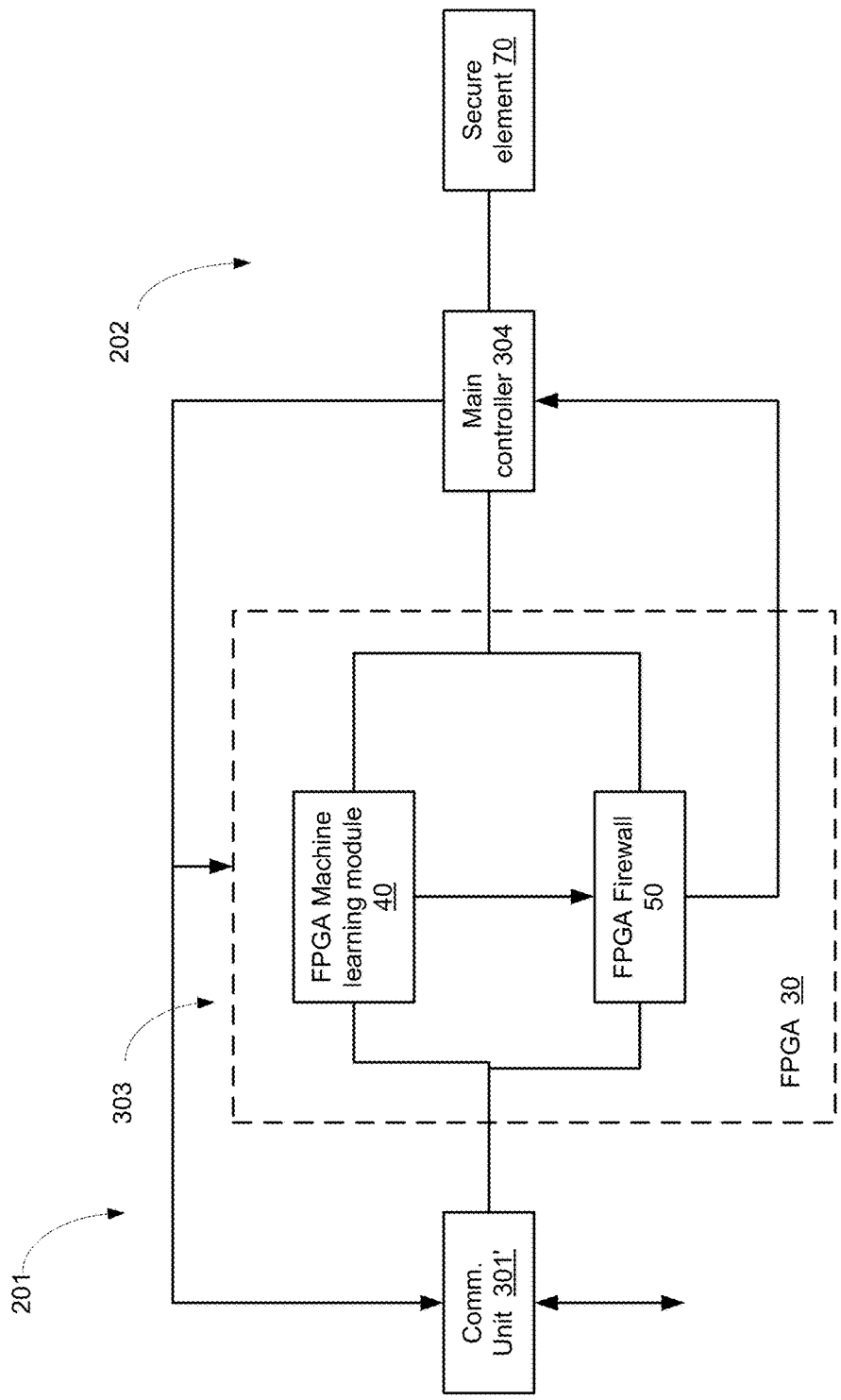
FIG. 10 is an example of a mobile wallet.

FIG. 10 illustrates a mobile wallet 103 that has a content filter 303 that is implemented as a PLD (for example—a FPGA) 30. PLD 30 includes PLD machine learning module 40 and PLD firewall 50.

It has been found that implementing the content filter as a PLD is beneficial from various reasons. In contract to ASICs, the function of the different gates, input and output ports and other components of the PLD is not published, may change from one user to the other and even from one programming session to the other. Security problems are not published and patched—and thus the PLD content filter is harder to hack.

PLD 30 includes a PLD machine learning module 40 and a PLD firewall 50.

Both PLD machine learning module 40 and PLD firewall 50 are coupled to communication unit 20 and to main controller 304. The main controller 304 is coupled to secure element 70.

The PLD machine learning module may be configured to learn (and/or be fed with) patterns of valid ingress traffic and/or patterns of valid egress traffic. The learning process may involve performing many simulations/transactions—for example thousands, then thousands, and even more.

The learning of the valid pattern of ingress and/or egress traffic may include feeding the PLD machine learning module (or a machine learning unit located outside the mobile device) with large number of valid ingress traffic and/or egress traffic—and learning patterns—especially learning valid ranges of various ingress and/or egress parameters—such as but not limited to data rate, order of messages, content of fields within messages, pauses between messages, and the like.

For example—egress traffic and ingress traffic related to multiple cryptocurrencies and cryptographic tokens can be learnt. This traffic may include ingress traffic and egress traffic related to knows operations such as selling, verification, digital signature, transactions, and the like.

After learning learn (and/or be fed with) patterns of valid ingress traffic and/or patterns of valid egress traffic, the PLD machine learning module may monitor ingress traffic and/or egress traffic and find deviations from the valid patterns. These deviations are also referred to as anomalies.

The learning period may be followed by a monitoring period. Alternatively, the monitoring period and the learning period may partially overlap. Thus—the PLD machine learning module may start monitoring traffic—while the learning period proceeds. Thus—result of monitoring actual traffic may be used to tune the PLD machine learning module. The PLD machine learning module may receive feedback from the PLD firewall and/or from the main controller and/or from an entity outside the mobile device related to anomalies detected by the PLD machine learning module, and/or about anomalies that were not detected by the PLD machine learning module, about traffic that was blocked and/or unblocked by the firewall, and the like.

The valid patterns may include allowable value ranges of various traffic parameters. Anomalies may exceed these ranges.

The PLD machine learning module may or not be fed by firewall rules. Accordingly—the PLD machine learning module can detect anomalies that may or may not comply with firewall rules.

Accordingly—the PLD machine learning module may detect anomalies even when these anomalies are not blocked by the firewall.

The PLD machine learning module may inform the PLD firewall that it detected an anomaly. Additionally or alternatively, the PLD machine learning module may inform the main controller about an anomaly. The PLD firewall may notify the main controller about the anomaly.

Additionally or alternatively, the PLD machine learning module may generate an alert that is sent to another entity—including the user or another outside the mobile device.

An alert sent to the user may use any man machine interface of the mobile device, and/or another mobile device (such as a smartphone) that communicated with mobile wallet 103.

The PLD firewall may be initialized with firewall rules and may block ingress traffic and/or egress traffic that should be blocked according to the firewall rules.

The firewall rules may be updating using a secure firewall rule update process.

The PLD firewall may send information about firewall events (blocking traffic, breach of firewall rules) to the main controller and/or to another entity.

The PLD firewall and/or the main controller may be configured to respond to a detection of an anomaly by preforming at least one of the following:
a. Do not respond.
b. Log the detection of the anomaly.
c. Blocking traffic. The blocked traffic may be erased. The blocked traffic may include only the one or more messages that caused the anomaly, may include one or more messages that did not cause the anomaly, only messages that have the same direction (ingress or egress) of the one or more messages that caused the anomaly, messages at both directions of traffic.
d. Block the traffic and resume the traffic after a period of time.
e. Generate an alert to the user.
f. Generating an alert to the user, awaiting for a response—and resuming traffic when the user did not respond or approved the resuming of the traffic.
g. Shutting down the mobile device and/or any part of the mobile device.

Main controller 304 may control the PLD 30 and/or the communication unit. This may include enforcing any of the mentioned above responses to a detection of the anomaly, or any other response.

Secure element 70 may be integrated with main controller 304.

Figure 11:
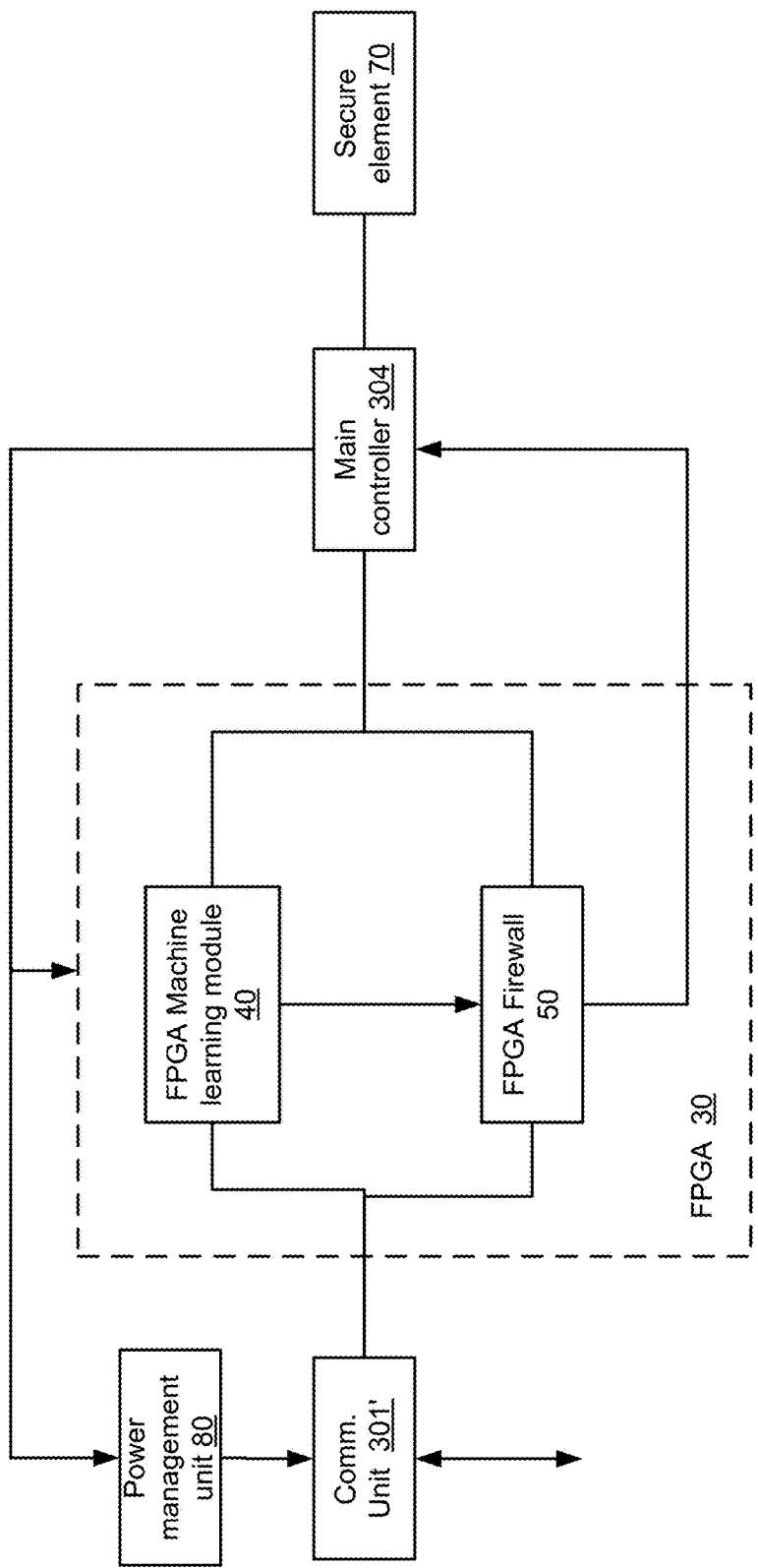
FIG. 11 is an example of a mobile wallet.

FIG. 11 illustrates mobile wallet 103. Mobile wallet 103 of FIG. 11 differs from the mobile wallet of FIG. 10 by having a power management unit 80 that supplied power to (at least) the communication unit 301'. A request to shut down the communication unit 301' is fed to the power management unit 80 that in turn shuts down the communication unit 301'.

A request may be sent by the main controller 304 or PLD 30.

Figure 12:
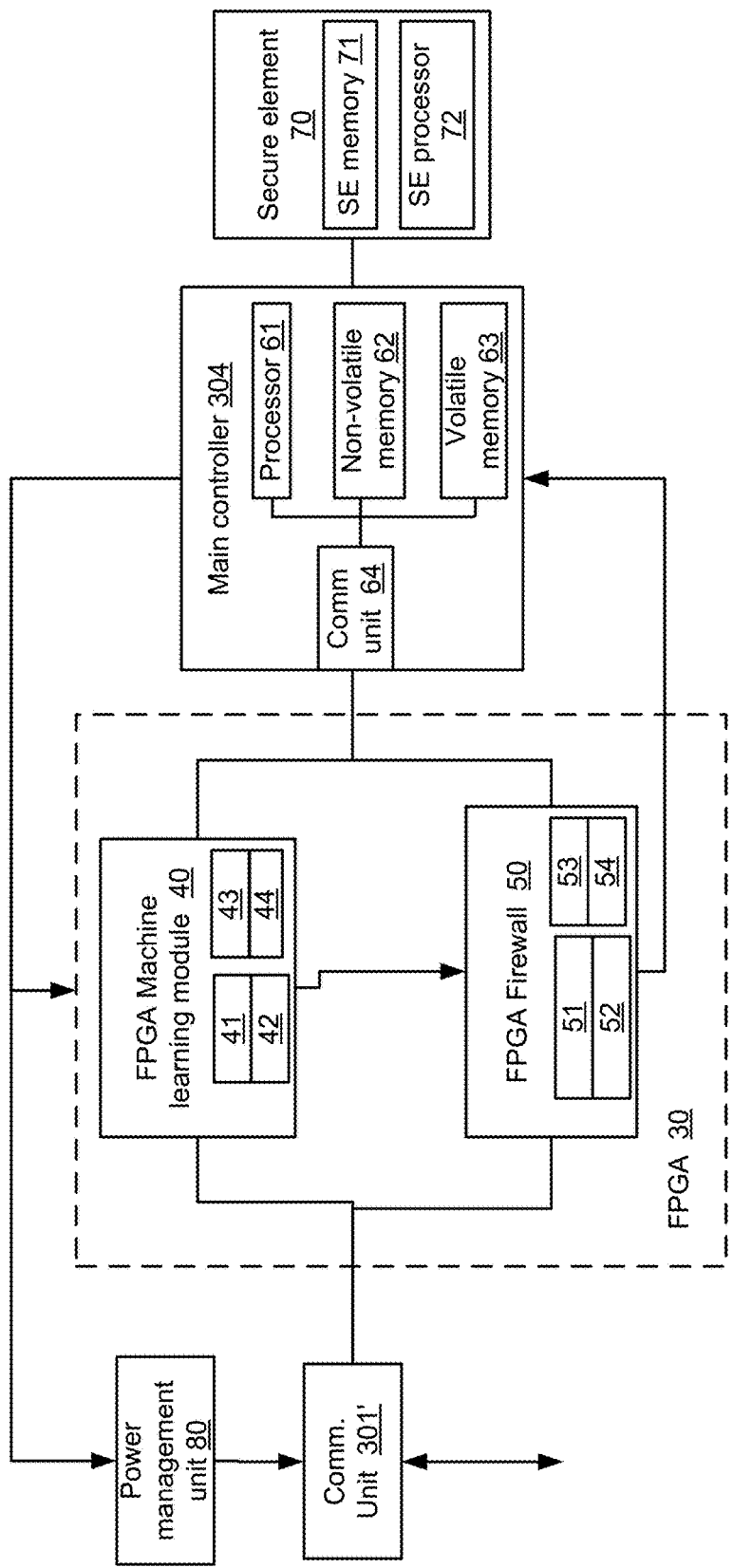
FIG. 12 is an example of a mobile wallet.

FIG. 12 illustrates mobile wallet 103.

PLD machine learning module 40 is illustrated as including ingress buffer 41 egress buffer 42, and neural network 43.

PLD firewall 50 is illustrated as including ingress buffer 51, egress buffer 52, volatile memory 63 (for storing firewall rules), and controller 54 that implements the firewall rules.

The egress and the ingress registers of the PLD machine learning module may be smaller and even much smaller than the egress and the ingress registers of the PLD firewall. The egress and the ingress registers of the PLD machine learning module may be required to store small segments of the traffic (for example—1 or few bytes) while the egress and the ingress registers of the PLD firewall. May be required to store larger segments of the traffic—for example—a whole message (for example 1 Kbyte)—that has to be hashed. Alternatively, the PLD machine learning module and the PLD firewall can use the same egress and ingress registers.

Main controller 304 includes a hardware communication unit 64 that is coupled to the PLD on one side and to additional components of the main controller 304 on the other side. These other components may include a processor 61, non-volatile memory 62 and volatile memory 63. It should be noted that the main controller 304 may be coupled to secure element 70 and/or to any combination of elements out of removable memory 309, external memory 310, secure memory 311 (may be included in secure element 70), TRNG 312, encryption module 313, authentication module 314, buttons 305, display 306, sensors—such as but not limited to authentication sensors 307, emitters 308.

Secure element may be a dedicated integrated circuit or may implemented on the same integrated circuit such as main controller 304.

Secure element 70 is illustrated as including secure element (SE) memory 71 and SE processor 72.

SE memory 71 may store, for example, the private key of a transaction. The private key may be stored in an encrypted form. The private key may be decrypted when used during cryptography operations and then (after the completion of the cryptography operation) be erased.

FIG. 12 illustrates mobile wallet 103. The secure element of the mobile wallet 103 of FIG. 12 differs from the secure element of the mobile wallet of FIG. 11 by having an encryption engine 73. It should be noted that SE processor 72 may operate as an encryption engine.

Figure 13:
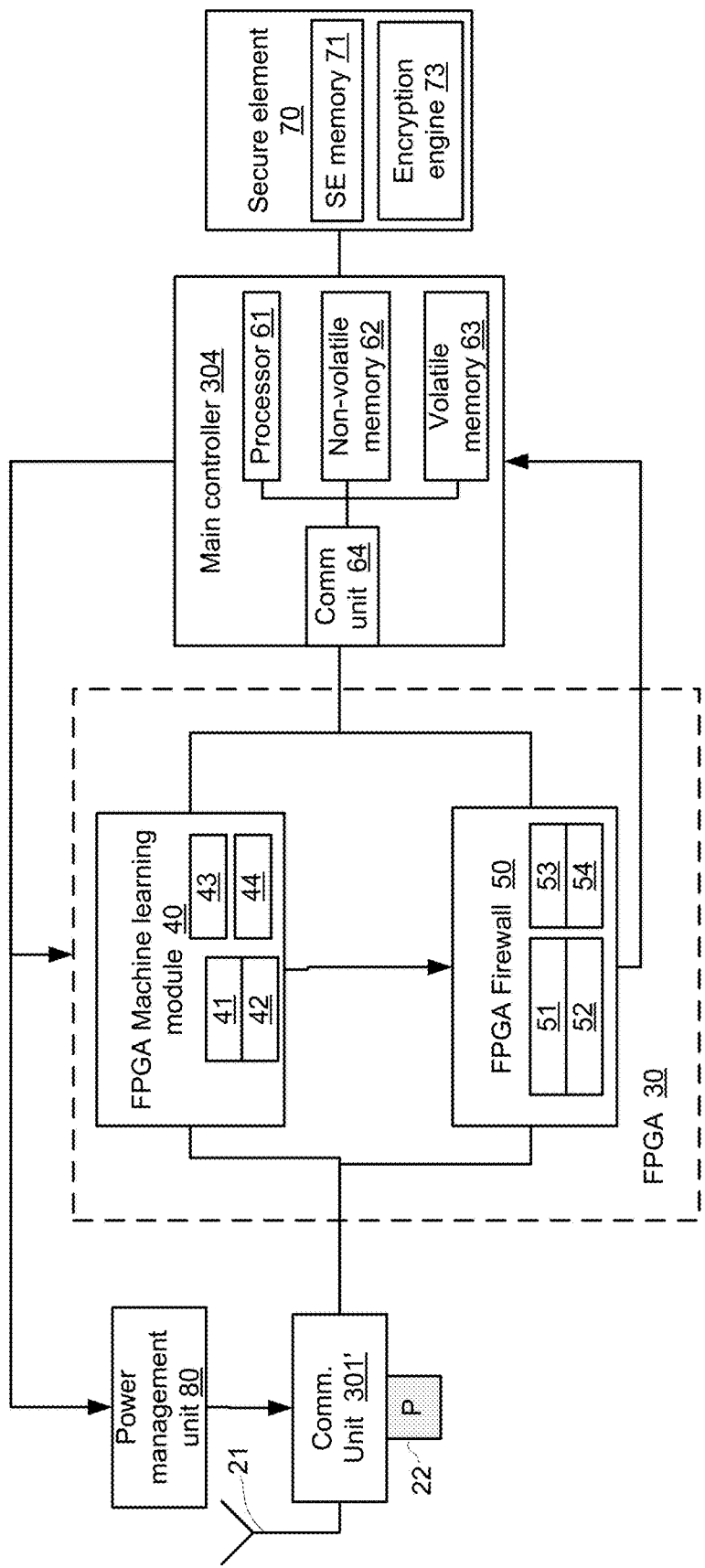
FIG. 13 is an example of a mobile wallet.

In FIG. 13 the communication unit 30' is illustrated as including an antenna 21 for wireless communication and a plug for wired coupling of the mobile wallet 103.

Figure 14:
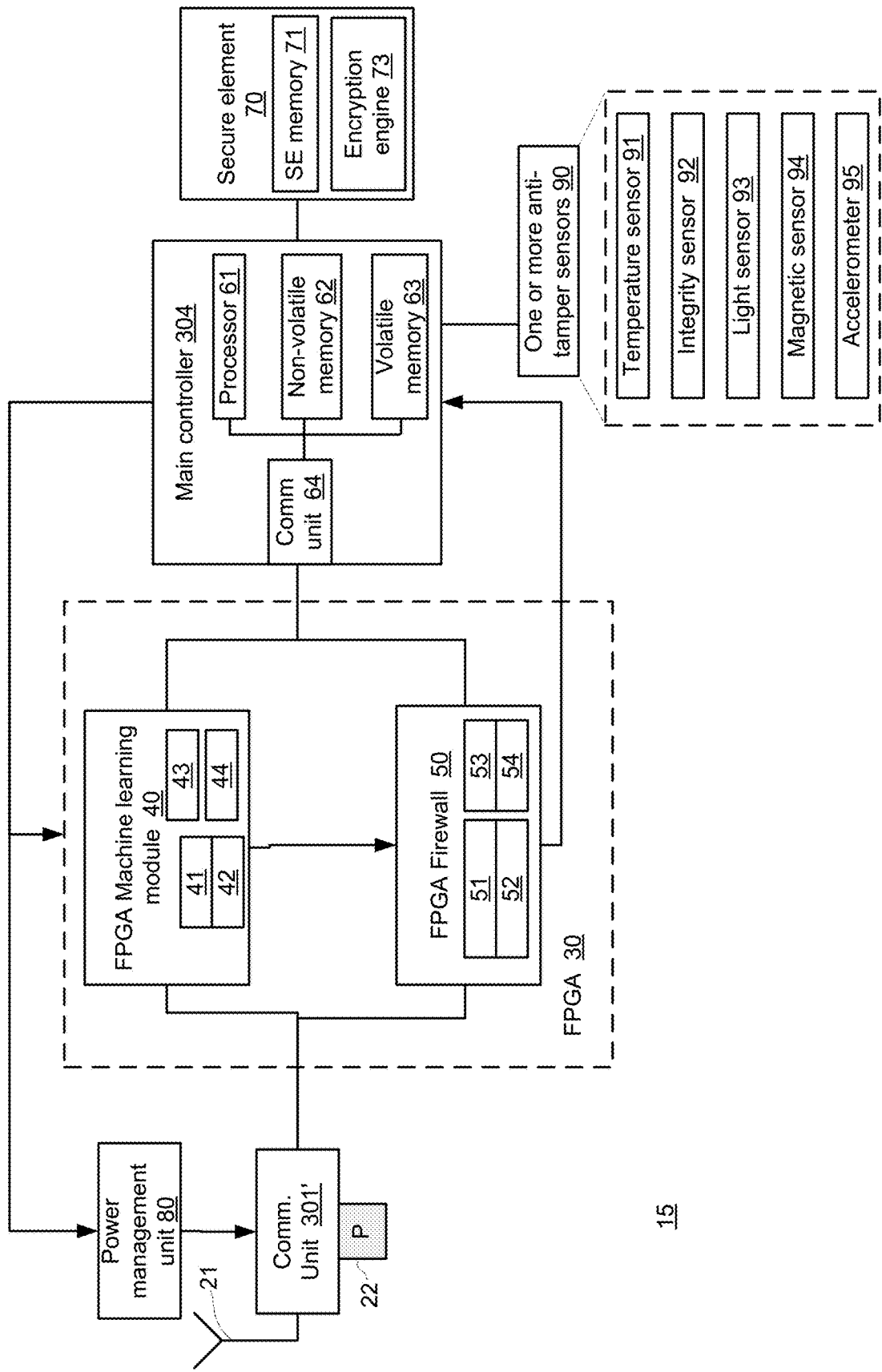
FIG. 14 is an example of a mobile wallet.

FIG. 14 illustrates mobile wallet 103. Mobile wallet 103 of FIG. 14 differs from the mobile wallet of FIG. 13 by showing one or more anti-tamper sensors 90 that are coupled to main controller 304.

The one or more anti-tamper sensors may include at least one out of temperature sensor 91, integrity sensor 92, light sensor 93, magnetic sensor 94 and accelerometer 95.

Temperature sensor 91 may detect a heating of the mobile wallet 303—which is indicative of an attempt to unweld some of the conductors of the mobile wallet 103.

Integrity sensor 92 may detect an attempt to remove parts of the mobile wallet—such as a protective cage and/or a sealing layer such as an non-transparent epoxy layer.

Light sensor 93 may attempt light levels that are not expected to be received in a closed cage—and thus detects attempts to remove at least some parts of the cage.

Magnetic sensor 94 detects attempts to erase data or code or otherwise disrupt the operation of the mobile device using a strong magnetic field.

Accelerometer 95 may sense attempts to break the mobile device.

Figure 15:
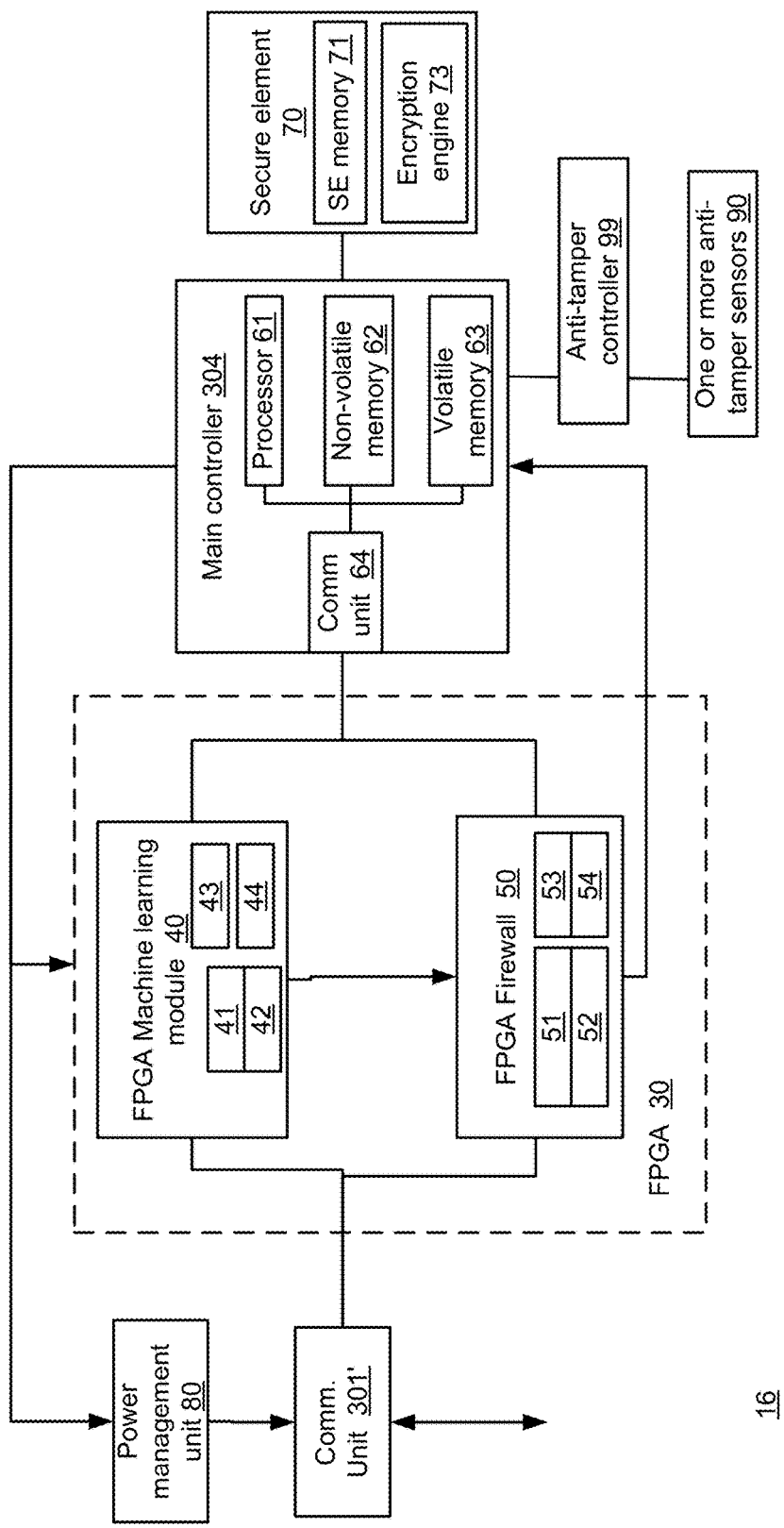
FIG. 15 is an example of a mobile wallet.

When a tamper attempt is detected the main controller may decide to shut down the mobile device and/or to erase the content of one or more volatile and/or non-volatile memory—including but not limited to device firmware, commands, firewall rules, machine learning weights, and the like. FIG. 15 illustrates mobile wallet 103. Mobile wallet 103 of FIG. 15 differs from the mobile wallet of FIG. 15 by showing an anti-tamper controller 99 that is coupled between the main controller 304 and the one or more anti-tamper sensors 90. The anti-tamper controller 99 determines whether a tamper attempt occurred—and notifies the main controller accordingly. The anti-tamper controller can optionally shut down the mobile device and/or to erase the content of one or more volatile and/or non-volatile memory—including but not limited to device firmware, commands, firewall rules, machine learning weights, and the like.

Figure 16:
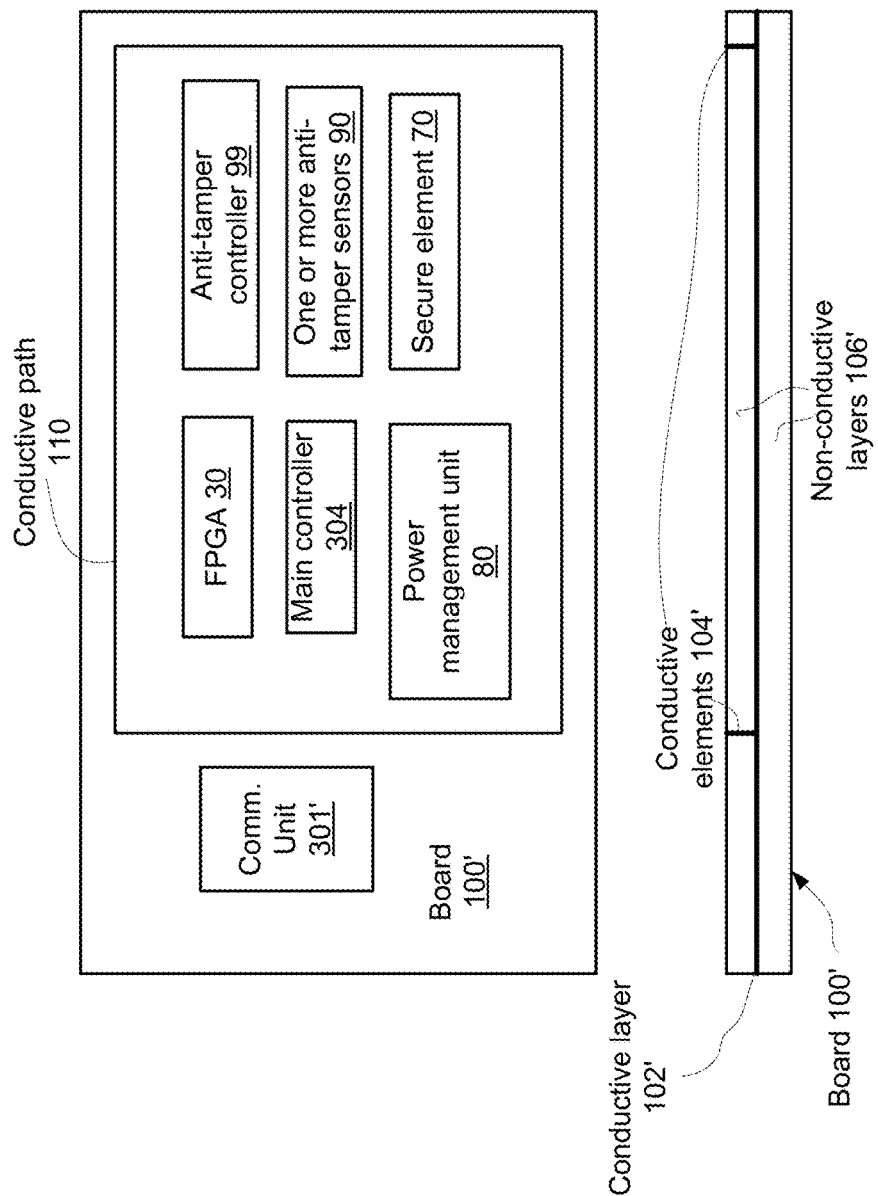
FIG. 16 is an example of one or more components of a mobile wallet.

FIG. 16 includes a top view and a cross sectional view of a board 100' (such as a PCB) of mobile wallet 103.

The board includes a conductive layer 102' that is positioned between non-conductive layers 106'.

The conductive layer 102' is electrically coupled by conductive elements (such as but not limited to conductive vias) 104' that pass through the upper conductive layer and may be electrically coupled to a conductive path 110' form on the board 100' and is electrically coupled to a conductive cage to form an electromagnetic shield that surrounds elements of the secure portion—such as PLD 30, main controller 304, power management unit 80, anti-tamper controller 99, one or more anti-tamper sensors 90, and secure element 70. Any combination of the above components may be shielded by the cage.

Communication unit 301' may be positioned within or outside the cage.

Figure 17:
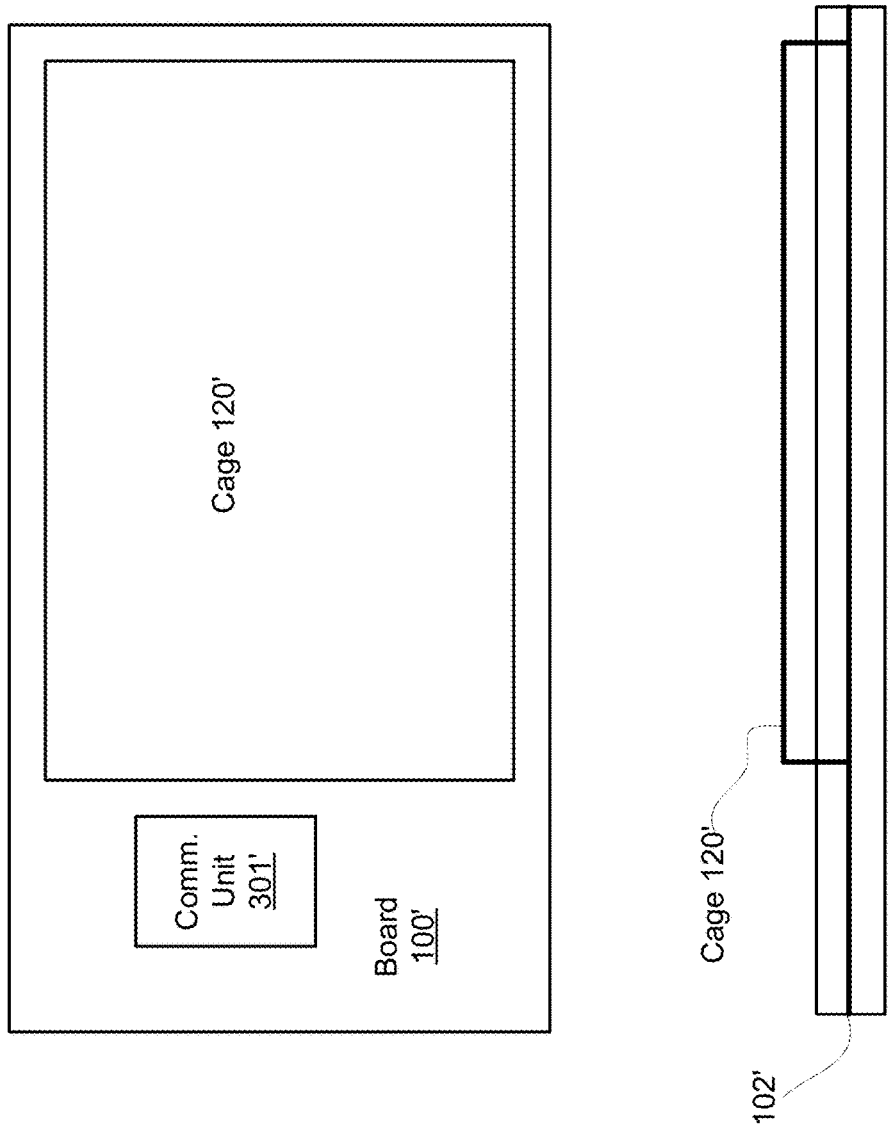
FIG. 17 is an example of one or more components of a mobile wallet.

FIG. 17 includes a top view and a cross sectional view of a board 100' (such as a PCB) of mobile wallet 103.

FIG. 17 illustrates the board 100' after cage 120' was electrically coupled to the conductive path 110' and to conductive elements 104'. The cage was also mechanically connected to board (for example—by welding).

The cage may be made of an electrically conductive and rigid material such as steel, iron, and the like.

Figure 18:
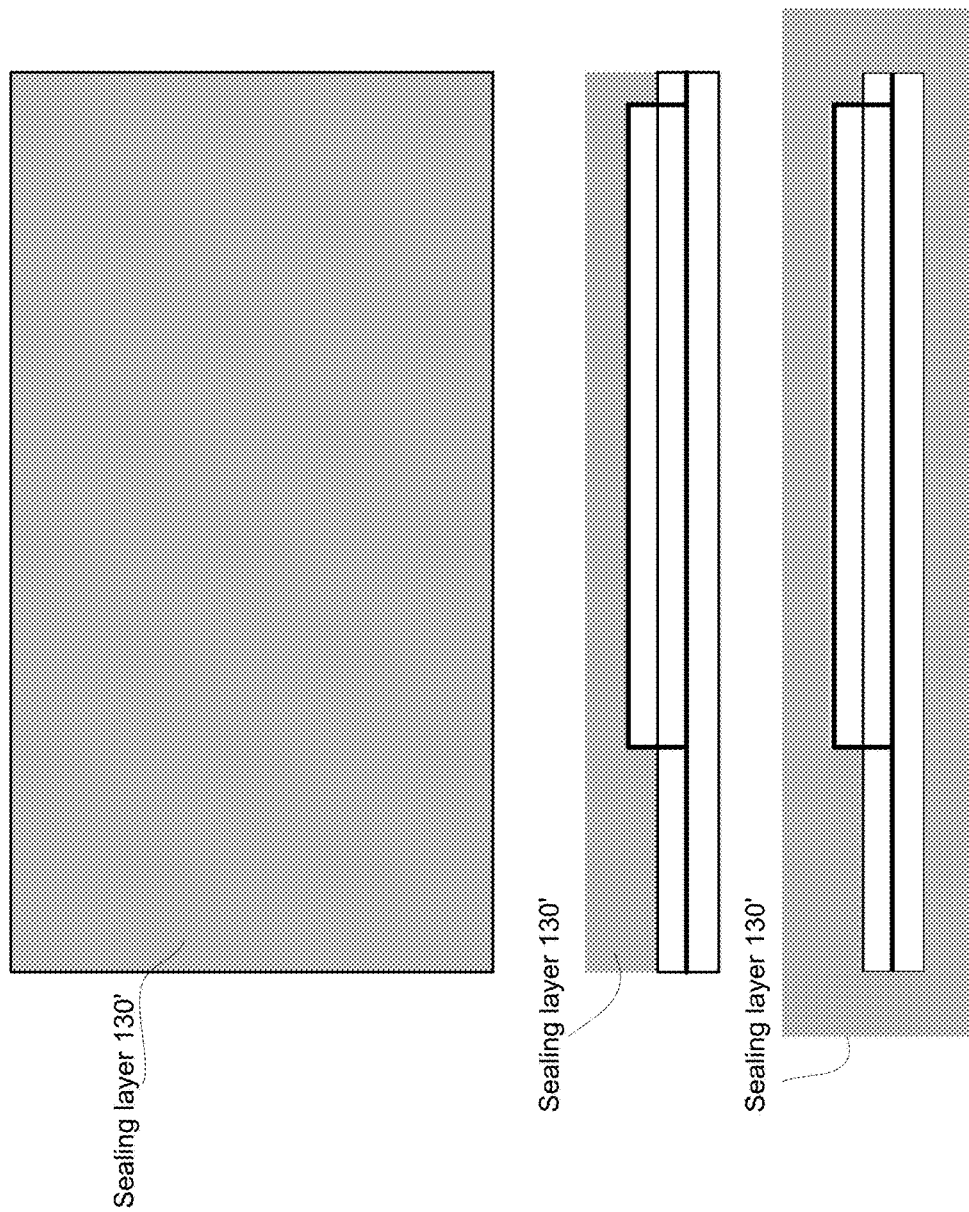
FIG. 18 is an example of one or more components of a mobile wallet.

FIG. 18 illustrates the board 100' after being coated with a sealing layer 130'. The sealing layer may be deposited on the cage and exposed parts of the board. There may be more than one sealing layers. One or more sealing layers may partially or completely surround board 100'.

Figure 19:
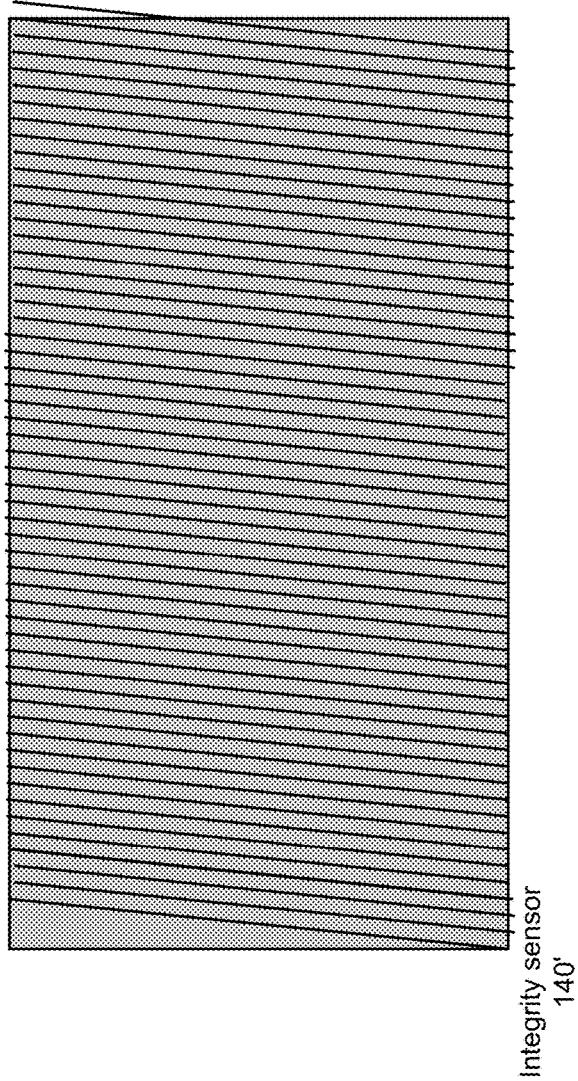
FIG. 19 is an example of one or more components of a mobile wallet.

FIG. 19 illustrates the board 100' after the board and the sealing layer are surrounded by an integrity sensor 140' that may form a conductive loop. Once the integrity sensor is damaged the conductive loop is disconnected.

Figure 20:
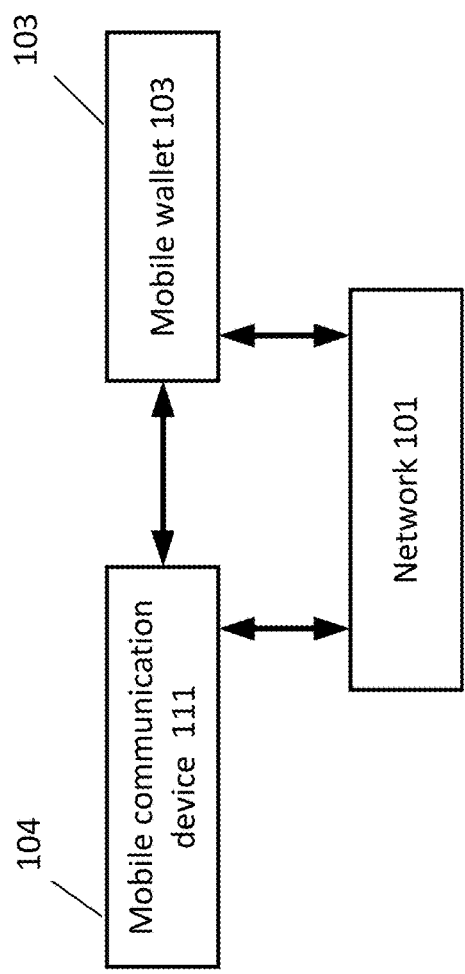
FIG. 20 is an example of the mobile wallet, a network and a mobile communication device.

FIG. 20 is an example of the mobile wallet 103, a network 101 and a mobile communication device 111. The mobile communication device may be a smartphone or any other communication device that is mobile and can interact with a user. We will assume, for simplicity of explanation, that it is easier to interact with the smartphone than with the mobile wallet—as the mobile wallet may have fewer and/or smaller man machine interfaces—for example smaller screen.

The user may initiate or otherwise participate in secure transactions by interacting with both the mobile communication device and the mobile wallet.

For example, approved recipients may be defined in advance. The mobile wallet will be allowed to add internal secured recipient list, it will allow the user to pay by selecting a name of a recipient instead of a cryptocurrency address.

The user may define a recipient as an approved recipient and store in the mobile wallet a name of the approved recipient and a cryptocurrency address of the approved recipient that will appear on the display of the secure wallet at the same time and wait to the approval of the transaction by the user (by pressing a button, touching a touch screen and the like).

The approval also requires the smartphone to display (at the same time as the display by the mobile wallet) the name of the approved recipient and the sum to be paid. The name display on the smartphone may be selected by the user.

The user may also approve a code update of the mobile wallet by using the mobile communication device.

This may include using two layers of protection of the firmware code update.

There may be provided an air authenticated and encrypted virtual tunnel between the secure processor in the wallet and the remote server on the internet.

The new firmware is received and stored in a secured memory (memory unit that is located in the secure portion) in an encrypted form.

The main controller and/or the secure element checks a hash and a signature of the new firmware and then, if OK, loads it into a non-volatile memory (of the secure portion) that acts as a non-volatile configuration memory, while decrypting the new firmware (received in an encrypted form) on the fly.

The main controller and/or the secure element presents the user on a screen of the mobile wallet, information about the new firmware such as a new firmware identification that may include a version, a date of generation of the new firmware version, a target device to have its firmware updated (PLD, tamper controller, application controller, communication module), and a signature.

The user can approve or reject the update by interacting with the mobile wallet—for example by pressing a button.

Scrambling can be done on everything that goes from the PLD to the main controller. The PLD and the main controller may use synchronized TRNGs of any other mechanism that allows them to decrypt messages sent between them, and then encrypt the encrypted message.

The update of firmware may include:
  a. The user requests the mobile communication device to send an updated code to the mobile wallet and also informs the mobile wallet that a code update should be executed.
  b. The mobile communication device sends the updated code to the mobile wallet.
  c. The communication unit of the mobile wallet receives the updated code.
  d. The PLD of the mobile wallet is configured to scramble the updated code to provide a scrambled code.

e. The PLD sends the scrambled code to a non-volatile memory of the mobile wallet.
f. A cryptography entity of the mobile wallet is configured to calculate a hash of the scrambled code.
g. A display of the mobile wallet is configured to display the hash.
h. A man machine interface of the mobile wallet is configured to receive an conformation of a user, following the display of the hash.
i. Upon reception of the approval, the mobile wallet is configured to descramble the scrambled code and to replace the scrambled code stored in the non-volatile memory with the code.

Figure 21:
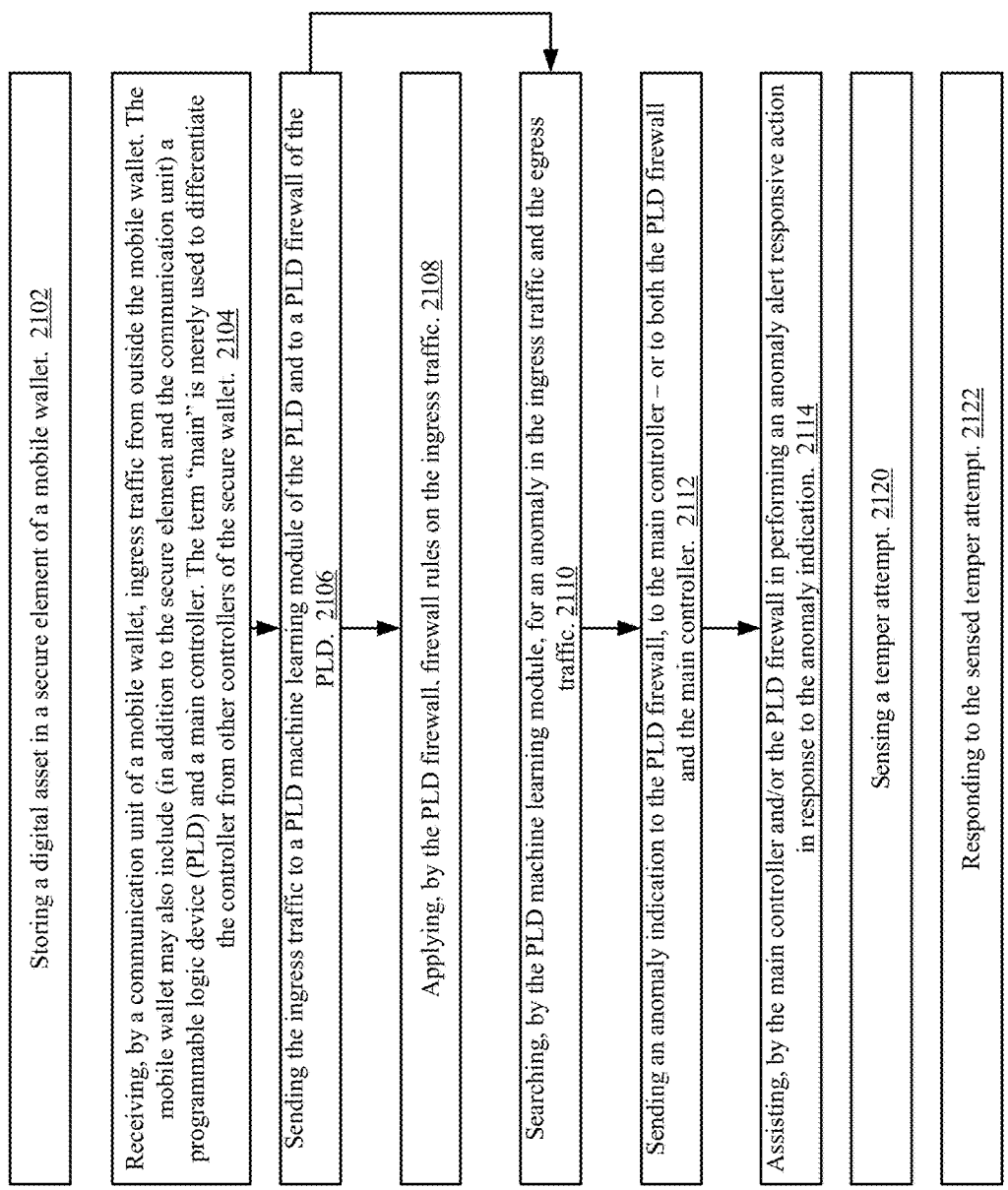
FIG. 21 is an example of a method.

FIG. 21 illustrates method 2100 for storing a digital asset in a mobile wallet.

Method 2100 may include any of the listed below steps.

Step 2102 of storing a digital asset in a secure element of a mobile wallet.

Step 2104 of receiving, by a communication unit of a mobile wallet, ingress traffic from outside the mobile wallet. The mobile wallet may also include (in addition to the secure element and the communication unit) a programmable logic device (PLD) and a main controller. The term "main" is merely used to differentiate the controller from other controllers of the secure wallet.

Step 2106 of sending the ingress traffic to a PLD machine learning module of the PLD and to a PLD firewall of the PLD.

Step 2106 may be followed by steps 2108 and 2110.

Step 2108 may include applying, by the PLD firewall, firewall rules on the ingress traffic. Step 2108 may include blocking one or more ingress data entities (packets, messages, and the like) or passing the one or more ingress data entities. Step 2108 may be responsive to inputs from the PLD machine learning module—especially responsive to anomaly alerts.

Step 2110 may include searching, by the PLD machine learning module, for an anomaly in the ingress traffic and the egress traffic. If an anomaly is detected, then step 2110 may be followed by step 2112 of sending an anomaly indication to the PLD firewall, to the main controller—or to both the PLD firewall and the main controller.

Step 2114 may include assisting, by the main controller and/or the PLD firewall in performing an anomaly alert responsive action in response to the anomaly indication.

The assisting may include instructing a component of the secure wallet to perform the anomaly alert responsive action, requesting a component of the secure wallet to perform the anomaly alert responsive action or even executing the anomaly alert responsive action by the main controller and/or the PLD firewall.

Step 2114 may include at least one of the following (can be executed by the main controller or the PLD)—or any other anomaly alert responsive action illustrated in the application.
a. Do nothing.
b. Log the alert.
c. Shutting down the communication unit.
d. Instructing a power management unit of the mobile wallet to shut down the mobile wallet.
e. Deleting at least one message that caused the anomaly.
f. Preventing the propagation of ingress and/or egress traffic—at least for a certain period.

Method 2100 may include step 2120 of sensing a temper attempt and step 2122 of responding to the sensed temper attempt.

Method 2100 may also include at least one of the following steps:
a. Receiving the anomaly indication by the PLD firewall, and informing (by the PLD firewall) the main controller about the anomaly. The informing may be executed in a case any an anomaly is detected or only when certain conditions are fulfilled. For example—the informing may occur when the firewall rules are not set to block a propagation of traffic that includes the anomaly.
b. Learning by the PLD machine learning module patterns of valid ingress traffic.
c. Detecting the anomaly as a deviation from the patterns of valid ingress traffic.
d. Scrambling data units sent between the PLD and the main controller.
e. Unscarmbling scrambled data units that are send between the PLD and the main controller. The scrambling and the unscrambling can be executed using a TRNG or any other scrambling and/or unscrambling methods.
f. Assisting (by generating a user percievable request audio and/or vidio and/or vibrations) in inducing a user to receive a password.
g. Temporarily storing the (user provided) password.
h. Generating, by a cryptography entity of the mobile wallet, a cryptography key.
i. Encrypting a cryptography key with the password to provide an encrypted key.
j. Deleting, by the mobile wallet, the password and storing the encrypted key in at least one memory module.
k. Performing cryptograph operations by the secure element. This may occur, for example, during a secure ledger transaction, cryptocurrency transactions.
l. Collaborate with a mobile communication device. For example—when a double authentication is required, when performing transactions, and the like.
m. Receive an updated code from a mobile communication device.
n. Scrambling the updated code to provide a scrambled code and sending the scrambled code to a non-volatile memory of the mobile wallet.
o. Calculating a hash of the code.
p. Displaying by a display of the mobile wallet the hash.
q. Receiving by a man machine interface of the mobile wallet a conformation of a user, following the display of the hash.
r. Upon reception of the approval, descramble the code and replace the code stored in the non-volatile memory with the new code.

The mobile wallet may output egress traffic. Egress traffic may be sent from the main controller to the PLD and may be blocked, passed to the communication unit, outputted from the mobile wallet, and/or may trigger an anomaly alert.

While method 2200 was described in relation to ingress traffic, it is applicable, mutatis mutandis, to egress traffic.

Figure 22:
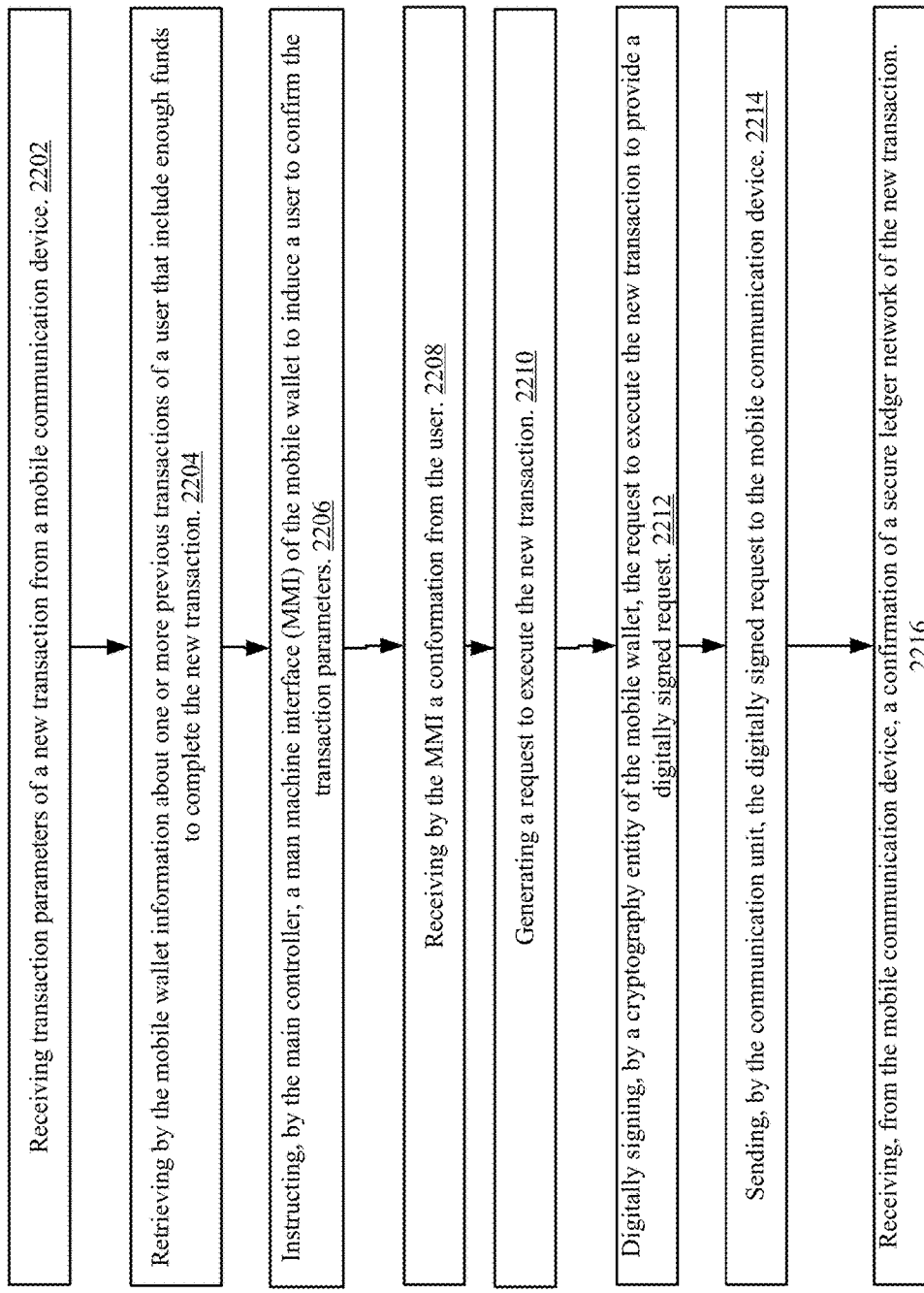
FIG. 22 is an example of a method.

FIG. 22 illustrates method 2200.

Method 2200 may include the following steps:

Step 2202 of receiving transaction parameters of a new transaction from a mobile communication device.

Step 2204 of retrieving by the mobile wallet information about one or more previous transactions of a user that include enough funds to complete the new transaction.

Step 2206 of instructing, by the main controller, a man machine interface (MMI) of the mobile wallet to induce a user to confirm the transaction parameters.

Step 2208 of receiving by the MMI a conformation from the user.

Step 2210 of generating a request to execute the new transaction.

Step 2212 of digitally signing, by a cryptography entity of the mobile wallet, the request to execute the new transaction to provide a digitally signed request.

Step 2214 of sending, by the communication unit, the digitally signed request to the mobile communication device.

Step 2216 of receiving, from the mobile communication device, a confirmation of a secure ledger network of the new transaction.

Step 2202 may be executed without accessing the mobile communication device.

The transaction parameters may be price, recipient and commission fee.

Method 2200 may include at least one out of:
a. Displaying, on a display of the mobile wallet, a name of a recipient and an amount of funds to be transferred to the recipient.
b. Receiving an approval of the user (by a screen or any other MMI of the mobile wallet) of a transaction that involves transferring the amount of funds to the recipient.
c. Sending, by the communication unit, information about the approval to a mobile communication device.

Figure 23:
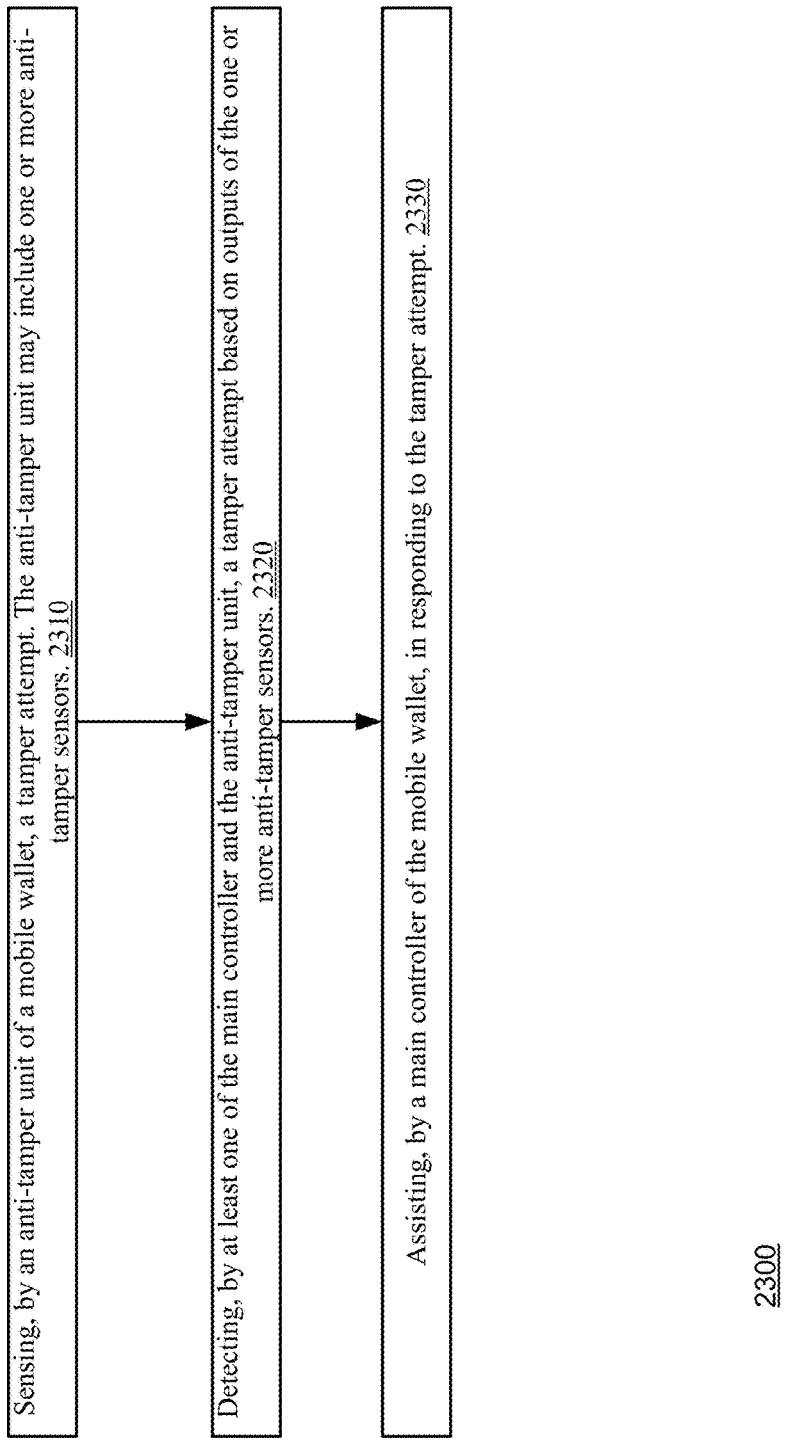
FIG. 23 is an example of a method.

FIG. 23 illustrates method 2300.

Method 2300 may start by step 2310 of sensing, by an anti-tamper unit of a mobile wallet, a tamper attempt. The anti-tamper unit may include one or more anti-tamper sensors.

Step 2310 may be followed by step 2320 of detecting, by at least one of the main controller and the anti-tamper unit, a tamper attempt based on outputs of the one or more anti-tamper sensors.

The anti-tamper unit may include an anti-tamper controller that differs from the main controller. The method may include determining that a tamper attempt occurred by the anti-tamper controller.

The mobile wallet may include a board and the anti-tamper unit may include a cage. The board may be connected to the PLD and to the main controller. The cage may be electrically connected to interior conductive elements of the board thereby providing an electromagnetic shield that surrounds the PLD and the main controller. A tamper attempt may be an attempt to open and/or remove the cage.

The mobile wallet may include a sealing layer that covers the cage, an upper surface of the board and the communication unit.

A tamper attempt may be an attempt to open and/or remove the sealing layer.

The sealing layer and the board may be surrounded by an integrity sensor that is one of the anti-tamper sensors.

The interior conductive elements of the board may include a conductive layer that is positioned between non-conductive layers of the board, and conducting vias that extend between the conductive layer and an upper surface of the board. A tamper attempt may be an attempt to open and/or remove the conductive layer and/or the conducting vias.

An anti-tamper sensor may be positioned within the cage and/or outside the cage.

The one or more anti-tamper sensors may include a temperature sensor. Step 2310 may include sensing, by the temperature sensor, a heating resulting from an attempt to unweld one or more conductors of the mobile wallet.

The one or more anti-tamper sensors may include a light sensor. Step 2310 may include sensing, by the light sensor, a breach of the cage. When the cage is non-transparent or just partially transparent, a change in the level of light sensed by the sensor may indicate of a tamper attempt.

The one or more anti-tamper sensors may include a magnetic sensor. Step 2310 may include sensing, by the magnetic sensor, a tamper attempt that involves disrupting the operation of the mobile wallet (for example—erasing the memory) using a strong magnetic field. Strong may mean a magnetic field that may erase data from memory units.

The one or more anti-tamper sensors may include an accelerometer. Step 2310 may include sensing accelerations (for example—more than 2 G) that are indicative of an attempt to break the mobile wallet.

The mobile wallet may include a PLD machine learning module and a PLD firewall; wherein the PLD machine learning module is configured to detect an anomaly in at least one out of the ingress traffic and the egress traffic, and to send an anomaly indication to at least one out of the PLD firewall and the main controller; wherein the PLD firewall is configured to apply firewall rules on the ingress traffic and on the egress traffic; wherein one or more entity of the main controller and the PLD firewall is configured to assist in performing an anomaly alert responsive action in response to the anomaly indication.

Step 2320 may be followed by step 2330 of assisting, by a main controller of the mobile wallet, in responding to the tamper attempt.

Step 2330 may include at least one out of stopping communication, deleting content from the secure wallet—the content may include data, instructions, firmware, and the like.

The mobile wallet may also include (in addition to the main controller and and the anti-tamper unit) a communication unit, a programmable logic device (PLD), and a secure element that stores a digital asset.

Method 2300 may also include at least one out of:
a. Receiving, by the communication unit, ingress traffic from outside the mobile wallet.
b. Output, by the communication unit, egress traffic not blocked by the PLD.
c. Monitoring by the PLD ingress traffic and egress traffic.
d. Determining, by the PLD, whether to pass or block ingress messages of the ingress traffic and egress messages of the egress traffic.

The invention may also be implemented in a non-transitory computer readable medium that stores instructions that may form a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as flash memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "rear" "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between various components are merely illustrative and that alternative embodiments may merge various components or impose an alternate decomposition of functionality upon various components. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" Each other such that the desired functionality is achieved, irrespective of architectures or intermedial components. Likewise, any two components so associated can also be viewed as being "operably connected," or "operably coupled," to Each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps than those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A mobile wallet for storing a digital asset, the mobile wallet comprises:
   a communication unit;
   a programmable logic device (PLD);
   a main controller;
   a secure element; and
   an anti-tamper unit that comprises one or more anti-tamper sensors;
   wherein the secure element is configured to store the digital asset;
   wherein the communication unit is configured to receive ingress traffic from outside the mobile wallet and to output egress traffic not blocked by the PLD;
   wherein the PLD is configured to monitor ingress traffic and egress traffic, and to determine whether to pass or block ingress messages of the ingress traffic and egress messages of the egress traffic;
   wherein at least one of the main controller and the anti-tamper unit is configured to detect a tamper attempt based on outputs of the one or more anti-tamper sensors;
   wherein the main controller is configured to assist in responding to a detected tamper attempt;
   wherein the PLD comprises a PLD machine learning module and a PLD firewall;
   wherein the PLD machine learning module is configured to detect an anomaly in at least one out of the ingress traffic and the egress traffic, and to send an anomaly indication to at least one out of the PLD firewall and the main controller;

wherein the PLD firewall is configured to apply firewall rules on the ingress traffic and on the egress traffic;

wherein one or more entity of the main controller and the PLD firewall is configured to assist in performing an anomaly alert responsive action in response to the anomaly indication; and wherein the PLD machine learning module comprises an ingress buffer and an egress buffer that store segments of traffic that are of a size that is less than one percent from a size of segments of traffic stored by an ingress buffer and an egress buffer of the PLD firewall.

2. The mobile wallet according to claim 1, wherein the mobile wallet comprises a board and the anti-tamper unit comprises a cage; wherein the board is coupled to the PLD and to the main controller, wherein the cage is electrically coupled to interior conductive elements of the board thereby providing an electromagnetic shield that surrounds the PLD and the main controller.

3. The mobile wallet according to claim 2, further comprising a sealing layer that covers the cage, an upper surface of the board and the communication unit.

4. The mobile wallet according to claim 3, wherein the sealing layer and the board are surrounded by an integrity sensor.

5. The mobile wallet according to claim 2, wherein the interior conductive elements of the board comprise a conductive layer that is positioned between non-conductive layers of the board, and conducting vias that extend between the conductive layer and an upper surface of the board.

6. The mobile wallet according to claim 2, wherein the one or more anti-tamper sensors are positioned within the cage.

7. The mobile wallet according to claim 6, the anti-tamper unit comprise at least one additional anti-tamper sensors that is positioned outside the cage.

8. The mobile wallet according to claim 6, wherein the one or more anti-tamper sensors comprise a temperature sensor that is configured to sense a heating resulting from an attempt to unweld one or more conductors of the mobile wallet.

9. The mobile wallet according to claim 6, wherein the one or more anti-tamper sensors comprise a light sensor that is configured to detect a breach in the cage.

10. The mobile wallet according to claim 1, wherein the one or more anti-tamper sensors comprise a magnetic sensor that is configured to sense an attempt to disrupt the operation of the mobile wallet using a magnetic field.

11. The mobile wallet according to claim 1, wherein the one or more anti-tamper sensors comprise an accelerometer that is configured to sense an attempt to break the mobile wallet.

12. The mobile wallet according to claim 1, wherein the main controller is configured to assist in responding to the tamper alert by shutting down the mobile wallet.

13. The mobile wallet according to claim 1, wherein the main controller is configured to assist in responding to the tamper alert by erasing a content of one or more volatile memory units of the mobile wallet.

14. The mobile wallet according to claim 1, wherein the anti-tamper unit comprises an anti-tamper controller that is coupled between the main controller and the one or more anti-tamper sensors; wherein the anti-tamper controller is configured to determine whether a tamper attempt occurred, and when a tamper attempt occurs to notify the main controller.

15. The mobile wallet according to claim 1, wherein the PLD comprises a PLD machine learning module and a PLD firewall; wherein the PLD machine learning module is configured to detect an anomaly in at least one out of the ingress traffic and the egress traffic, and to send an anomaly indication to the PLD firewall and to the main controller; wherein the PLD firewall is configured to apply firewall rules on the ingress traffic and on the egress traffic; wherein one or more entity of the main controller and the PLD firewall is configured to assist in performing an anomaly alert responsive action in response to the anomaly indication.

16. The mobile wallet according to claim 1, wherein the PLD is configured to scramble data units sent to the main controller and wherein the main controller is configured to descramble scrambled data units from the PLD.

17. The mobile wallet according to claim 1, that is configured to generate a user perceivable request to receive a password from the user.

18. A method, comprising:
storing a digital asset by a secure element of a mobile wallet;
sensing, by an anti-tamper unit of the mobile wallet, a tamper attempt; wherein the anti-tamper unit may include one or more anti-tamper sensors;
detecting, by at least one of the main controller and the anti-tamper unit, a tamper attempt based on outputs of the one or more anti-tamper sensors;
assisting, by a main controller of the mobile wallet, in responding to the tamper attempt;
receiving, by a communication unit of the mobile wallet ingress traffic from outside the mobile wallet;
outputting egress traffic not blocked by a programmable logic device (PLD) of the mobile wallet;
monitoring, by the PLD, ingress traffic and egress traffic;
determining by the PLD, whether to pass or block ingress messages of the ingress traffic and egress messages of the egress traffic;
receiving an updated code from a mobile communication device;
scrambling the updated code to provide a scrambled code and sending the scrambled code to a non-volatile memory of the mobile wallet;
calculating a hash of the updated code; displaying by a display of the mobile wallet the hash;
receiving by a man machine interface of the mobile wallet a confirmation of a user, following the display of the hash; and
upon reception of the confirmation, descrambling the updated code and replacing a code stored in the non-volatile memory with the updated code.

19. A non-transitory computer readable medium that stores instructions for:
storing a digital asset by a secure element of a mobile wallet;
sensing, by an anti-tamper unit of the mobile wallet, a tamper attempt;
wherein the anti-tamper unit may include one or more anti-tamper sensors;
detecting, by at least one of the main controller and the anti-tamper unit, a tamper attempt based on outputs of the one or more anti-tamper sensors;
assisting, by a main controller of the mobile wallet, in responding to the tamper attempt;
receiving, by a communication unit of the mobile wallet ingress traffic from outside the mobile wallet;
outputting egress traffic not blocked by a programmable logic device (PLD) of the mobile wallet;
monitoring, by the PLD, ingress traffic and egress traffic;

determining by the PLD, whether to pass or block ingress messages of the ingress traffic and egress messages of the egress traffic;

receiving an updated code from a mobile communication device;

scrambling the updated code to provide a scrambled code and sending the scrambled code to a non-volatile memory of the mobile wallet;

calculating a hash of the updated code; displaying by a display of the mobile wallet the hash;

receiving by a man machine interface of the mobile wallet a confirmation of a user, following the display of the hash; and upon reception of the confirmation, descrambling the updated code and replacing a code stored in the non-volatile memory with the updated code.

\* \* \* \* \*